United States Patent
Hassan et al.

(10) Patent No.: US 11,195,209 B2
(45) Date of Patent: Dec. 7, 2021

(54) METHOD, MEDIUM, AND SYSTEM FOR KEYWORD BIDDING IN A MARKET COOPERATIVE

(71) Applicant: eBay Inc., San Jose, CA (US)

(72) Inventors: Sameer Hassan, San Francisco, CA (US); Stephen Kenneth Lobo, Redwood City, CA (US); Stephen Richard Thomas, Los Altos Hills, CA (US)

(73) Assignee: eBay Inc., San Jose, CA (US)

( * ) Notice: Subject to any disclaimer, the term of this patent is extended or adjusted under 35 U.S.C. 154(b) by 252 days.

(21) Appl. No.: 16/583,651

(22) Filed: Sep. 26, 2019

(65) Prior Publication Data
US 2020/0098014 A1   Mar. 26, 2020

Related U.S. Application Data

(63) Continuation of application No. 15/401,986, filed on Jan. 9, 2017, now Pat. No. 10,475,082, which is a continuation of application No. 13/607,251, filed on Sep. 7, 2012, now Pat. No. 9,542,707, which is a continuation of application No. 12/892,401, filed on Sep. 28, 2010, now Pat. No. 8,266,006.

(60) Provisional application No. 61/257,632, filed on Nov. 3, 2009.

(51) Int. Cl.
| G06Q 30/00 | (2012.01) |
| G06Q 30/02 | (2012.01) |
| G06F 16/951 | (2019.01) |
| G06Q 30/08 | (2012.01) |

(52) U.S. Cl.
CPC ....... *G06Q 30/0275* (2013.01); *G06F 16/951* (2019.01); *G06Q 30/02* (2013.01); *G06Q 30/0277* (2013.01); *G06Q 30/08* (2013.01); *G06Q 30/0274* (2013.01)

(58) Field of Classification Search
CPC ............... G06Q 30/0275; G06Q 30/02; G06Q 30/0277; G06Q 30/08; G06Q 30/0274; G06Q 30/242; G06Q 30/273; G06Q 30/248; G06F 16/951
See application file for complete search history.

(56) References Cited

U.S. PATENT DOCUMENTS

| 6,499,030 B1 | 12/2002 | Igata |
| 6,704,727 B1 | 3/2004 | Kravets |
| 6,826,572 B2 | 11/2004 | Colace et al. |

(Continued)

OTHER PUBLICATIONS

Zhang, Linfeng, and Yong Guan. "Detecting click fraud in pay-per-click streams of online advertising networks." 2008 The 28th International Conference on Distributed Computing Systems. IEEE, 2008. (Year: 2008).*

(Continued)

*Primary Examiner* — Matthew E Zimmerman
(74) *Attorney, Agent, or Firm* — Schwegman Lundberg & Woessner P.A.

(57) ABSTRACT

A computer-implemented method and system for keyword bidding in a market cooperative are disclosed. A particular embodiment includes receiving a keyword bid from a first party; determining a value to a host associated with the keyword bid; augmenting the keyword bid by an amount corresponding to the value to the host; and sending the augmented keyword bid to a second party.

20 Claims, 29 Drawing Sheets

(56) References Cited

U.S. PATENT DOCUMENTS

| | | |
|---|---|---|
| 6,876,997 B1 | 4/2005 | Rorex et al. |
| 7,007,014 B2 | 2/2006 | Liu et al. |
| 7,035,812 B2 | 4/2006 | Meisel et al. |
| 7,225,151 B1 | 5/2007 | Konia |
| 7,225,182 B2 | 5/2007 | Paine et al. |
| 7,689,458 B2 | 3/2010 | Heckerman et al. |
| 7,752,190 B2 | 7/2010 | Skinner |
| 7,792,858 B2 | 9/2010 | Tang et al. |
| 7,983,959 B2 | 7/2011 | Chickering et al. |
| 8,036,937 B2 | 10/2011 | Tang et al. |
| 8,234,276 B2 | 7/2012 | Skinner |
| 8,266,006 B2 | 9/2012 | Hassan et al. |
| 8,655,912 B2 | 2/2014 | Tang et al. |
| 8,912,655 B2 | 12/2014 | Nakajima |
| 8,996,403 B2 | 3/2015 | Tang et al. |
| 9,026,528 B2 | 5/2015 | Skinner |
| 9,311,662 B2 | 4/2016 | Skinner |
| 9,406,080 B2 | 8/2016 | Tang et al. |
| 9,529,897 B2 | 12/2016 | Tang et al. |
| 9,542,707 B2 | 1/2017 | Hassan et al. |
| 10,402,858 B2 | 9/2019 | Tang et al. |
| 10,475,082 B2 | 11/2019 | Hassan et al. |
| 2001/0037314 A1* | 11/2001 | Ishikawa ............... G06Q 30/02 705/67 |
| 2002/0013763 A1 | 1/2002 | Harris |
| 2002/0038241 A1 | 3/2002 | Hiraga |
| 2002/0038282 A1 | 3/2002 | Montgomery |
| 2002/0072895 A1 | 6/2002 | Imanaka et al. |
| 2002/0111847 A1 | 8/2002 | Smith, II |
| 2002/0116313 A1 | 8/2002 | Detering |
| 2002/0128949 A1 | 9/2002 | Wiesehuegel et al. |
| 2002/0188694 A1 | 12/2002 | Yu |
| 2003/0055729 A1 | 3/2003 | Bezos et al. |
| 2003/0055816 A1 | 3/2003 | Paine et al. |
| 2003/0088525 A1 | 5/2003 | Velez et al. |
| 2003/0105677 A1 | 6/2003 | Skinner |
| 2003/0220918 A1 | 11/2003 | Roy et al. |
| 2004/0010518 A1 | 1/2004 | Montemer |
| 2004/0068460 A1 | 4/2004 | Feeley et al. |
| 2004/0088241 A1 | 5/2004 | Rebane et al. |
| 2004/0199397 A1 | 10/2004 | Dresden |
| 2004/0199496 A1 | 10/2004 | Liu et al. |
| 2004/0230574 A1 | 11/2004 | Kravets |
| 2004/0249709 A1 | 12/2004 | Donovan et al. |
| 2005/0065844 A1 | 3/2005 | Raj et al. |
| 2005/0071325 A1 | 3/2005 | Bem |
| 2005/0097024 A1 | 5/2005 | Rainey |
| 2005/0137939 A1 | 6/2005 | Calabria et al. |
| 2005/0144064 A1 | 6/2005 | Calabria et al. |
| 2005/0144065 A1 | 6/2005 | Calabria et al. |
| 2005/0149396 A1 | 7/2005 | Horowitz et al. |
| 2005/0189415 A1 | 9/2005 | Fano et al. |
| 2005/0223000 A1 | 10/2005 | Davis et al. |
| 2005/0228797 A1 | 10/2005 | Koningstein et al. |
| 2006/0004628 A1 | 1/2006 | Axe et al. |
| 2006/0041536 A1 | 2/2006 | Scholl et al. |
| 2006/0069614 A1 | 3/2006 | Agarwal et al. |
| 2006/0069784 A2 | 3/2006 | hsu et al. |
| 2006/0095281 A1 | 5/2006 | Chickering et al. |
| 2006/0136294 A1* | 6/2006 | Linden ............... G06Q 30/0257 705/14.47 |
| 2006/0149623 A1 | 7/2006 | Badros et al. |
| 2006/0173744 A1 | 8/2006 | Kandasamy et al. |
| 2006/0184500 A1 | 8/2006 | Najork et al. |
| 2006/0206516 A1 | 9/2006 | Mason |
| 2007/0022005 A1* | 1/2007 | Hanna ............... G06Q 30/0261 705/14.1 |
| 2007/0027754 A1 | 2/2007 | Collins et al. |
| 2007/0027756 A1 | 2/2007 | Collins et al. |
| 2007/0027768 A1 | 2/2007 | Collins et al. |
| 2007/0027792 A1 | 2/2007 | Smith |
| 2007/0073579 A1 | 3/2007 | Immorlica et al. |
| 2007/0100811 A1 | 5/2007 | Error et al. |
| 2007/0130004 A1 | 6/2007 | Borgs et al. |
| 2007/0143266 A1 | 6/2007 | Tang et al. |
| 2007/0156757 A1 | 7/2007 | Tang et al. |
| 2007/0162379 A1 | 7/2007 | Skinner |
| 2007/0174124 A1 | 7/2007 | Zagofsky et al. |
| 2008/0114624 A1 | 5/2008 | Kitts |
| 2008/0320125 A1 | 12/2008 | O'sullivan et al. |
| 2009/0012853 A1 | 1/2009 | Nolet et al. |
| 2009/0216592 A1* | 8/2009 | Zhang ............... G06Q 30/0209 705/14.12 |
| 2010/0318568 A1 | 12/2010 | Tang et al. |
| 2011/0010263 A1 | 1/2011 | Skinner |
| 2011/0106642 A1 | 5/2011 | Hassan et al. |
| 2012/0016906 A1 | 1/2012 | Tang et al. |
| 2012/0290386 A1 | 11/2012 | Skinner |
| 2013/0006757 A1 | 1/2013 | Hassan et al. |
| 2014/0164383 A1 | 6/2014 | Tang et al. |
| 2015/0206184 A1 | 7/2015 | Tang et al. |
| 2015/0235278 A1 | 8/2015 | Skinner |
| 2016/0225018 A1 | 8/2016 | Skinner |
| 2016/0321695 A1 | 11/2016 | Tang et al. |
| 2017/0116647 A1 | 4/2017 | Hassan et al. |

OTHER PUBLICATIONS

U.S. Appl. No. 11/427,090 U.S. Pat. No. 7,792,858, filed Jun. 28, 2006, Computer-Implemented Method and System for Combining Keywords Into Logical Clusters That Share Similar Behavior With Respect to a Considered Dimension.

U.S. Appl. No. 12/860,564 U.S. Pat. No. 8,655,912, filed Aug. 20, 2010, Computer-Implemented Method and System for Combining Keywords Into Logical Clusters That Share Similar Behavior With Respect to a Considered Dimension.

U.S. Appl. No. 14/181,052 U.S. Pat. No. 9,529,897, filed Feb. 14, 2014, Computer-Implemented Method and System for Combining Keywords Into Logical Clusters That Share Similar Behavior With Respect to a Considered Dimension.

U.S. Appl. No. 11/427,097 U.S. Pat. No. 8,036,937, filed Jun. 28, 2006, A Computer-Implemented Method and System for Enabling the Automated Selection of Keywords for Rapid Keyword Portfolio Expansion.

U.S. Appl. No. 13/243,869 U.S. Pat. No. 8,996,403, filed Sep. 23, 2011, A Computer-Implemented Method and System for Enabling the Automated Selection of Keywords for Rapid Keyword Portfolio Expansion.

U.S. Appl. No. 14/673,351 U.S. Pat. No. 9,406,080, filed Mar. 30, 2015, Computer-Implemented Method and System for Enabling the Automated Selection of Keywords for Rapid Keyword Portfolio Expansion.

U.S. Appl. No. 15/206,964, filed Jul. 11, 2016, Computer-Implemented Method and System for Enabling the Automated Selection of Keywords for Rapid Keyword Portfolio Expansion.

U.S. Appl. No. 11/517,886 U.S. Pat. No. 7,752,190, filed Sep. 8, 2006, A Computer-Implemented Method and System for Managing Keyword Bidding Prices.

U.S. Appl. No. 12/830,193 U.S. Pat. No. 8,234,276, filed Jul. 2, 2010, A Computer-Implemented Method and System for Managing Keyword Bidding Prices.

U.S. Appl. No. 13/560,744 U.S. Pat. No. 9,026,528, filed Jul. 27, 2012, A Computer-Implemented Method and System for Managing Keyword Bidding Prices.

U.S. Appl. No. 14/703,251 U.S. Pat. No. 9,311,662, filed May 4, 2015, A Computer-Implemented Method and System for Managing Keyword Bidding Prices.

U.S. Appl. No. 15/096,003, filed Apr. 11, 2016, A Computer-Implemented Method and System for Managing Keyword Bidding Prices.

U.S. Appl. No. 12/892,401 U.S. Pat. No. 8,266,006, filed Sep. 28, 2010, Method, Medium, and System for Keyword Bidding in a Market Cooperative.

U.S. Appl. No. 13/607,251 U.S. Pat. No. 9,542,707, filed Sep. 7, 2012, Method, Medium, and System for Keyword Bidding in a Market Cooperative.

U.S. Appl. No. 15/401,986 U.S. Pat. No. 10,475,082, filed Jan. 9, 2017, Method, Medium, and System for Keyword Bidding in a Market Cooperative.

(56) References Cited

OTHER PUBLICATIONS

Jacobson, "Google AdWords for Dummies", John Wiley and Sons Ltd, Aug. 31, 2009, 8 pages.
Immorlica et al., "Click fraud resistant methods for learning click-through rates", International Workshop on Internet and Network Economics, Internet and Network Economics, 2005, pp. 34-35.
Nobles, "The Web Position Gold 3", by Web Position, 2004, 4 pages.
Urchin, "Urchin 5.000 Administration/User Guide", Chapters 1-5, Jul. 26, 2005, 118 pages.
Urchin, "Urchin 5.000 Administration/User Guide," Chapters 6-8, Jul. 26, 2005, pp. 115-232.
Non Final Office Action received for U.S. Appl. No. 11/517,886, dated Jun. 9, 2008, 13 pages.
Response to Final Office Action filed on Apr. 19, 2011, for U.S. Appl. No. 12/830,193, dated Nov. 19, 2010, 10 pages.
Preliminary Amendment received for U.S. Appl. No. 15/401,986, filed Jun. 13, 2017, 7 pages.
Final Office Action received for U.S. Appl. No. 12/830,193, dated Nov. 19, 2010, 13 pages.
Notice of Allowance received for U.S. Appl. No. 15/401,986, dated Jun. 19, 2019, 12 pages.
Notice of Allowance received for U.S. Appl. No. 12/860,564, dated Oct. 9, 2013, 18 pages.
Supplemental Response to Non Final Office Action filed on Nov. 13, 2013, for U.S. Appl. No. 13/243,869, dated Mar. 11, 2013, 18 pages.
First Action Interview—Office Action received for U.S. Appl. No. 14/673,351, dated Oct. 15, 2015, 7 pages.
First Action Pre-Interview Communication received for U.S. Appl. No. 14/673,351, dated Aug. 10, 2015, 5 pages.
Notice of Allowance received for U.S. Appl. No. 14/703,251, dated Dec. 15, 2015, 11 pages.
Response to Non-Final Office Action filed on Oct. 25, 2017, for U.S. Appl. No. 15/096,003, dated Jul. 24, 2017, 18 pages.
Corrected Notice of Allowability Received for U.S. Appl. No. 15/401,986, dated Oct. 10, 2019, 4 pages.
U.S. Appl. No. 13/607,251, filed Sep. 7, 2012, Issued.
U.S. Appl. No. 12/892,401, filed Sep. 28, 2010, Issued.
U.S. Appl. No. 15/401,986, filed Jan. 9, 2017, Issued.
Response to Non Final Office Action filed on Apr. 12, 2013, for U.S. Appl. No. 13/560,744, dated Dec. 12, 2012, 9 pages.
Response to Non Final Office Action filed on Apr. 28, 2014, for U.S. Appl. No. 13/560,744, dated Nov. 26, 2013, 9 pages.
Response to Non Final Office Action filed on Oct. 1, 2013, for U.S. Appl. No. 13/560,744, dated May 1, 2013, 10 pages.
Applicant Initiated Interview Summary received for U.S. Appl. No. 13/607,251, dated Mar. 21, 2016, 3 pages.
Final Office Action received for U.S. Appl. No. 13/607,251, dated Feb. 1, 2016, 9 pages.
Final Office Action received for U.S. Appl. No. 13/607,251, dated Jul. 23, 2013, 16 pages.
Non-Final Office Action received for U.S. Appl. No. 13/607,251, dated Jan. 4, 2013, 15 pages.
Non-Final Office Action received for U.S. Appl. No. 13/607,251, dated May 8, 2015, 17 pages.
Notice of Allowance received for U.S. Appl. No. 13/607,251, dated Aug. 30, 2016, 10 pages.
Corrected Notice of Allowance received for U.S. Appl. No. 13/607,251, dated Sep. 7, 2016, 5 pages.
Response to Final Office Action filed on Aug. 1, 2016, for U.S. Appl. No. 13/607,251, dated Feb. 1, 2016, 12 pages.
Response to Final Office Action filed on Jan. 23, 2014, for U.S. Appl. No. 13/607,251, dated Jul. 23, 2013, 10 pages.
Response to Non-Final Office Action filed on Apr. 4, 2013, for U.S. Appl. No. 13/607,251, dated Jan. 4, 2013, 10 pages.
Response to Non-Final Office Action filed on Oct. 8, 2015, for U.S. Appl. No. 13/607,251, dated May 8, 2015, 16 pages.
Applicant Initiated Interview Summary received for U.S. Appl. No. 14/181,052, dated Aug. 21, 2015, 3 pages.
Applicant Initiated Interview Summary received for U.S. Appl. No. 14/181,052, dated Mar. 4, 2016, 3 pages.
Final Office Action received for U.S. Appl. No. 14/181,052, dated Nov. 6, 2015, 34 pages.
Non-Final Office Action received for U.S. Appl. No. 14/181,052, dated Feb. 20, 2015, 27 pages.
Notice of Allowance received for U.S. Appl. No. 14/181,052, dated Aug. 18, 2016, 12 pages.
Preliminary Amendment received for U.S. Appl. No. 14/181,052, filed Jun. 19, 2014, 7 pages.
Response to Final Office Action filed on Mar. 3, 2016, for U.S. Appl. No. 14/181,052, dated Nov. 6, 2015, 11 pages.
Response to Non-Final Office Action filed on Aug. 20, 2015, for U.S. Appl. No. 14/181,052, dated Feb. 20, 2015, 12 pages.
Notice of Allowance received for U.S. Appl. No. 14/673,351, dated Mar. 30, 2016, 8 pages.
Preliminary Amendment received for U.S. Appl. No. 14/673,351, filed Jul. 23, 2015, 9 pages.
Response to First Action Interview-Pre Interview Communication filed on Sep. 10, 2015, for U.S. Appl. No. 14/673,351, dated Aug. 10, 2015, 2 pages.
Response to First Action Interview—Office Action filed on Feb. 16, 2016, for U.S. Appl. No. 14/673,351, dated Oct. 15, 2015, 17 pages.
First Action Pre-Interview Communication received for U.S. Appl. No. 14/703,251, dated Sep. 3, 2015, 3 pages.
Preliminary Amendment received for U.S. Appl. No. 14/703,251, filed Dec. 1, 2015, 9 pages.
Response to First Action Interview-Pre Interview communication filed on Nov. 3, 2015, for U.S. Appl. No. 14/703,251, dated Sep. 3, 2015, 2 pages.
Advisory Action received for U.S. Appl. No. 15/096,003, dated Sep. 18, 2018, 5 pages.
Final Office Action received for U.S. Appl. No. 15/096,003, dated Jun. 5, 2018, 8 pages.
Final Office Action received for U.S. Appl. No. 15/096,003, dated Mar. 15, 2017, 10 pages.
Non Final Office Action received for U.S. Appl. No. 15/096,003, dated Aug. 25, 2016, 9 pages.
Non Final Office Action received for U.S. Appl. No. 15/096,003, dated Jul. 24, 2017, 13 pages.
Notice of Non-Compliant Amendment received for U.S. Appl. No. 15/096,003, dated Feb. 5, 2018, 3 pages.
Notice of Non-Compliant Amendment received for U.S. Appl. No. 15/096,003, dated Nov. 24, 2017, 3 pages.
Preliminary Amendment filed for U.S. Appl. No. 15/096,003, filed Apr. 29, 2016, 8 pages.
Response to Final Office Action filed on Jul. 17, 2017, for U.S. Appl. No. 15/096,003, dated Mar. 15, 2017, 20 pages.
Response to Final Office Action filed on Sep. 5, 2018, for U.S. Appl. No. 15/096,003, dated Jun. 5, 2018, 16 pages.
Response to Non-Final Office Action filed on Feb. 27, 2017, for U.S. Appl. No. 15/096,003, dated Aug. 25, 2016, 19 pages.
Response to Notice of Non-Compliant Amendment mailed on Jan. 24, 2018, for U.S. Appl. No. 15/096,003, dated Nov. 24, 2017, 22 pages.
Response to Notice of Non-Compliant Amendment dated May 7, 2018, for U.S. Appl. No. 15/096,003, dated Feb. 5, 2018, 24 pages.
Amendment filed on Feb. 21, 2019, for U.S. Appl. No. 15/206,964, 9 pages.
Corrected Notice of Allowability received for U.S. Appl. No. 15/206,964, dated Feb. 20, 2019, 12 pages.
First Action Interview-Pre Interview Communication received for U.S. Appl. No. 15/206,964, dated Nov. 8, 2018, 5 pages.
Notice of Allowability received for U.S. Appl. No. 15/206,964, dated Jul. 22, 2019, 5 pages.
Notice of Allowance received for U.S. Appl. No. 15/206,964, dated Jan. 4, 2019, 15 pages.
Notice Of Allowance received for U.S. Appl. No. 15/206,964 dated Apr. 15, 2019, 9 pages.
Preliminary Amendment received for U.S. Appl. No. 15/206,964, filed Jul. 28, 2016, 9 pages.

(56) References Cited

OTHER PUBLICATIONS

Response to First Action Interview—Pre-Interview Communication filed on Dec. 7, 2018, for U.S. Appl. No. 15/206,964, dated Nov. 8, 2018, 4 pages.
Google, Dear Inside AdWords . . . —deleting keywords, and those highlighted top ads, Posted by Vivian, Inside AdWords crew,Aug. 17, 2005, 5 pages.
Final Office Action received for U.S. Appl. No. 11/427,090, dated Nov. 4, 2009, 16 Pages.
Non-Final Office Action received for U.S. Appl. No. 11/427,090, dated Apr. 1, 2009, 14 Pages.
Notice of Allowance received for U.S. Appl. No. 11/427,090, dated Apr. 30, 2010, 10 Pages.
Response to Final Office Action filed on Mar. 4, 2010, for U.S. Appl. No. 11/427,090, dated Nov. 4, 2009, 12 Pages.
Response to Non-Final Office Action filed on Aug. 3, 2009, for U.S. Appl. No. 11/427,090, dated Apr. 1, 2009, 14 Pages.
Final Office Action received for U.S. Appl. No. 11/427,097, dated Nov. 28, 2008, 24 pages.
Final Office Action received for U.S. Appl. No. 11/427,097, dated Oct. 30, 2009, 22 pages.
Non-Final Office Action received for U.S. Appl. No. 11/427,097, dated Apr. 1, 2010, 25 pages.
Non-Final Office Action received for U.S. Appl. No. 11/427,097, dated Apr. 18, 2008, 17 pages.
Non-Final Office Action received for U.S. Appl. No. 11/427,097, dated May 14, 2009, 22 pages.
Notice of Allowance received for U.S. Appl. No. 11/427,097, dated Feb. 24, 2011, 8 pages.
Notice of Allowance received for U.S. Appl. No. 11/427,097, dated Jun. 3, 2011, 9 pages.
Notice of Allowance received for U.S. Appl. No. 11/427,097, dated Nov. 15, 2010, 11 pages.
Response to Final Office Action filed on Mar. 1, 2010, for U.S. Appl. No. 11/427,097, dated Oct. 30, 2009, 18 pages.
Response to Final Office Action filed on Mar. 30, 2009, for U.S. Appl. No. 11/427,097, dated Nov. 28, 2008, 12 pages.
Response to Non-Final Office Action filed on Aug. 14, 2009, for U.S. Appl. No. 11/427,097, dated May 14, 2009, 13 pages.
Response to Non-Final Office Action filed on Aug. 18, 2008, for U.S. Appl. No. 11/427,097, dated Apr. 18, 2008, 13 pages.
Response to Non-Final Office Action filed on Sep. 1, 2010, for U.S. Appl. No. 11/427,097, dated Apr. 1, 2010, 12 pages.
Final Office Action received for U.S. Appl. No. 11/517,886, dated Feb. 6, 2009, 11 pages.
Non-Final Office Action received for U.S. Appl. No. 11/517,886, dated Aug. 6, 2009, 11 pages.
Notice of Allowance received for U.S. Appl. No. 11/517,886, dated Feb. 22, 2010, 7 pages.
Response to Final Office Action filed on Jun. 8, 2009, for U.S. Appl. No. 11/517,886, dated Feb. 6, 2009, 13 pages.
Response to Non Final Office Action filed on Nov. 6, 2009, for U.S. Appl. No. 11/517,886, dated Aug. 6, 2009, 12 pages.
Response to Non Final Office Action filed on Oct. 9, 2008, for U.S. Appl. No. 11/517,886, dated Jun. 9, 2008, 14 pages.
Non Final Office Action received for U.S. Appl. No. 12/830,193, dated May 13, 2011, 9 pages.
Notice of Allowance received for U.S. Appl. No. 12/830,193, dated Jan. 30, 2012, 7 pages.
Notice of Allowance received for U.S. Appl. No. 12/830,193, dated Mar. 30, 2012, 5 pages.
Response to Non Final Office Action filed on Sep. 13, 2011, for U.S. Appl. No. 12/830,193, dated May 13, 2011, 9 pages.
Final Office Action received for U.S. Appl. No. 12/860,564, dated Mar. 1, 2012, 14 pages.
Non-Final Office Action received for U.S. Appl. No. 12/860,564, dated Sep. 14, 2011, 13 pages.
Preliminary Amendment received for U.S. Appl. No. 12/860,564, filed Sep. 14, 2010, 7 pages.
Response to Final Office Action filed on Jul. 2, 2012, for U.S. Appl. No. 12/860,564, dated Mar. 1, 2012, 12 pages.
Response to Non-Final Office Action filed on Jan. 17, 2012, for U.S. Appl. No. 12/860,564, dated Sep. 14, 2011, 10 pages.
Notice of Allowance received for U.S. Appl. No. 12/892,401, dated Jul. 25, 2012, 13 pages.
Notice of Allowance received for U.S. Appl. No. 12/892,401, dated May 14, 2012, 18 pages.
Applicant Initiated Interview Summary received for U.S. Appl. No. 13/243,869, dated Nov. 5, 2014, 3 pages.
Final Office Action received for U.S. Appl. No. 13/243,869, dated Nov. 20, 2013, 39 pages.
Non Final Office Action received for U.S. Appl. No. 13/243,869, dated Mar. 11, 2013, 66 pages.
Non Final Office Action received for U.S. Appl. No. 13/243,869, dated May 6, 2014, 42 pages.
Notice of Allowance received for U.S. Appl. No. 13/243,869, dated Nov. 19, 2014, 8 pages.
Preliminary Amendment received for U.S. Appl. No. 13/243,869, filed Nov. 1, 2012, 8 pages.
Response to Final Office Action filed on Apr. 21, 2014, for U.S. Appl. No. 13/243,869, dated Nov. 20, 2013, 13 pages.
Response to Non Final Office Action filed on Nov. 6, 2014, for U.S. Appl. No. 13/243,869, dated May 6, 2014, 15 pages.
Response to Non Final Office Action filed on Sep. 11, 2013, for U.S. Appl. No. 13/243,869, dated Mar. 11, 2013, 19 pages.
Final Office Action received for U.S. Appl. No. 13/560,744, dated Dec. 12, 2012, 12 pages.
Final Office Action received for U.S. Appl. No. 13/560,744, dated Jun. 26, 2014, 10 pages.
Non Final Office Action received for U.S. Appl. No. 13/560,744, dated May 1, 2013, 10 pages.
Non Final Office Action received for U.S. Appl. No. 13/560,744, dated Nov. 26, 2013, 10 pages.
Notice of Allowance received for U.S. Appl. No. 13/560,744, dated Jan. 7, 2015, 10 pages.

* cited by examiner

| KEYWORD | GLOBAL DIMENSIONS ||||||| SOURCE SPECIFIC ||||| TRAFFIC | | CLUSTERING ||
|---|---|---|---|---|---|---|---|---|---|---|---|---|---|---|---|---|
| | YAHOO VOLUME | # EBAY VOLUME | # EBAY SEARCH RESULTS | AFF KW? | INTERNATIONAL KW? | NATURAL KW? | ETC. | AFFILIATE ID | WHICH COUNTRY | COUNTRY REVENUE | COUNTRY COST | ETC. | TRAFFICKED | CPC | CATEGORY AFFINITY | VCPU BY KW |
| KEYWORD 1 | 100 | 30 | 200 | 1 | | | | 123 | NA | NA | NA | NA | | | | |
| KEYWORD 2 | 3 | 0 | 3 | | | 1 | | NA | NA | NA | NA | NA | | | | |
| ETC. | | | | | | | | | | | | | | | | |

*FIG. 5*

| KEYWORD | SCALED RPC | NEW BID | NEW NEXT BID | EXPECTED CPC |
|---|---|---|---|---|
| MAPLE WOOD | 0.247 | 0.26 | 0.26 | 0.22 |
| | CURRENT POSITION | CPChi | POS | CPClow |
| | 3 | 0.27 | 2 | 0.21 |
| | POS | MINIMUM DEVIATION | | |
| | 4 | 0.043 | | |
| | BID-2 | DEVIATION-2 | POSITION-2 | |
| | 0.28 | 0.043 | 1 | |
| | BID-1 | DEVIATION-1 | POSITION-1 | CEILING |
| | 0.27 | 0.033 | 2 | 0.35 |

*FIG. 6*

| KEYWORD | SCALED RPC | CPCavg | NEW CPCmax | PREVIOUS DAY CPCmax |
|---|---|---|---|---|
| LONGABERGER POTTERY | 0.66 | 0.14 | 0.77 | 0.77 |
| | IMPRESSIONS | CLICKS | COST | AVG. POS |
| | 67 | 5 | 0.68 | 1.1 |
| | $ DEVIATION | % DEVIATION | CALC CPCmax | CEILING |
| | 0.52 | 78.70% | 1.38 | 0.86 |

| Name | Partner | Active | Parameters | Groups | Delete |
|---|---|---|---|---|---|
| Google Experimental | Google US | Yes | ➚ | ➚ | ✗ |
| Google Main | Google US | Yes | ➚ | ➚ | ✗ |
| MSN Experimental | MSN US | Yes | ➚ | ➚ | ✗ |
| MSN Main | MSN US | Yes | ➚ | ➚ | ✗ |
| New Yahoo ABC US | Yahoo US | Yes | | ➚ | ✗ |
| Yahoo Experimental | Yahoo US | Yes | ➚ | ➚ | ✗ |
| Yahoo Main | Yahoo US | Yes | ➚ | ➚ | ✗ |

FIG. 9

| Edit ABC Parameters: Google | | |
|---|---|---|
| Default Minimum CPC | 0.05 | The minimum CPC we can bid for any keyword |
| Default Maximum CPC | 2.00 | The maximum CPC we can bid for any keyword |
| RPC Scaling Factor | 0.20 | The amount to adjust all RPCs by. Used to produce the Scaled RPC (Scaled RPC = RPC * RPC Scaling Factor) |
| Bid Ceiling Factor | 1.30 | Our bid amount should never exceed Bid Ceiling Factor * Scaled RPC |
| Bid Increment Factor | 2.00 | Limit all bid amount increases to no more than this % change |
| Bid Increment Velocity Factor | 1.00 | The amount to adjust the final bid by during upward movements of the bid |
| Bid Decrement Factor | 1.00 | Limit amount decreases to no more than this % change |
| Bid Decrement Velocity Factor | 1.00 | The amount to adjust the final bid by during downward movements of the bid |
| Max Acceptable Average Position | 1.50 | The goal for Avg Position. If we are spending less than the scaled_rpc and the Avg Position is greater than this...up our bid! |
| No Activity Delay Period | 5.00 | When there is no activity (no clicks, no impressions) don't do anything until this many days have passed |
| No Clicks Increment Factor | 0.15 | When there is no clicks at the end of the No Activity Delay Period then we want to increase the bid amount by this factor |
| No Impressions Increment Factor | 0.25 | When there is no impression at the end of the No Activity Delay Period then we want to increase the bid amount by this factor |
| Initial Bid Scaling Factor | 1.10 | The first bid for a new keyword is the (TPC * TPC Scaling Factor * Initial Bid Scaling Factor). NOTE: The initial bid must be below the Bid Ceiling, otherwise the Bid Ceiling will be used instead |
| Default RPC | 0.10 | The RPC value to use when no other RPC has been determined for a keyword |

Update Params

ONLINE (REAL TIME) OR OFFLINE BASED ON IMPLEMENTATION APPROACH/CONSTRAINTS

| MODEL | COEFF 1 | COEFF 2 | COEFF N | ROTATION PCT |
|---|---|---|---|---|
| M2 | 0 | 0.5 | 0.1 | 60 |
| M3 | 1.2 | 2 | 4 | 95 |

LIST OF ACTIVE MODELS

SCORE FOR AD ID 100
= 0X0 + 0.5X0.5 + 0.1X0.1
= 0.26

| AD ID | VAR N | VAR N | VAR N | MODEL | SCORE |
|---|---|---|---|---|---|
| 100 | 0 | 0.5 | 0.1 | M2 | 0.26 |
| 921 | 1.2 | 2 | 4 | M3 | 1.9 |

LIST OF MATCHED ADS

*FIG. 27*

METHOD, MEDIUM, AND SYSTEM FOR KEYWORD BIDDING IN A MARKET COOPERATIVE

PRIORITY CLAIM

This application is a continuation of U.S. patent application Ser. No. 15/401,986, filed Jan. 9, 2017, which is a continuation of U.S. patent application Ser. No. 13/607,251, filed on Sep. 7, 2012, which is a continuation of U.S. patent application Ser. No. 12/892,401, filed on Sep. 28, 2010, which claims the benefit of priority to U.S. Provisional Application Ser. No. 61/257,632, filed on Nov. 3, 2009, which applications are hereby incorporated by reference in their entirety.

BACKGROUND

Technical Field

This disclosure relates to methods and systems supporting keyword advertising associated with Internet search engine usage and keyword query submittal by a user. More particularly, the present disclosure relates to keyword bidding in a market cooperative.

Related Art

An increasingly popular way of delivering Internet advertisements is to tie the advertisement to search query results triggered by the entry of particular keywords (e.g. search queries) by a user. In order to target advertising accurately, advertisers or vendors pay to have their advertisements presented in response to certain kinds of queries—that is, their advertisements are presented when particular keyword combinations are supplied by the user of the search engine.

For example, when a user searches for "baseball cards," using a search engine such as Google or other well-known search engines, in addition to the usual query results, the user can also be shown a number of sponsored results. These can be paid advertisements for businesses, generally offering related goods and/or services. In this example, the advertisements may therefore be directed to such things as baseball card vendors, collectibles shops, sports memorabilia, or even sporting goods or event tickets. Of course, the advertisements may be directed to seemingly less related subject matter. While the presentation varies somewhat between search engines, these sponsored results are usually shown a few lines above, or on the right hand margin of the regular results. Although, the sponsored results may also be placed anywhere in conjunction with the regular results.

Keyword advertising is growing as other types of web advertising are generally declining. It is believed there are at least several features that contribute to its success. First, sponsored results are piggybacked on regular results, so they are delivered in connection with a valuable, seemingly objective, service to the user. By contrast, search engines that are built primarily on sponsored results have not been as popular. Second, the precision of the targeting of the advertising means the user is more likely to find the advertisements useful, and consequently can perceive the advertisements as more of a part of the service than as an unwanted intrusion. Unlike banners and pop-up advertisements, which are routinely ignored or dismissed, users appear more likely to click through these sponsored results (e.g., keyword advertisements). Third, the targeting is based entirely on the current query, and not on demographic data developed over longer periods of time. This kind of targeting is timelier and more palatable to users with privacy concerns. Fourth, these advertisements reach users when they are searching, and therefore when they are more open to visiting new web sites.

Companies, such as Google of Mountain View, Calif., which offers a search engine and Overture of Pasadena, Calif. (now Yahoo Search), which aggregates advertising for search engines as well as offering its own search engine, use an auction mechanism combined with a pay-per-click (PPC) pricing strategy to sell advertising. This model is appealing in its simplicity. Advertisers bid in auctions for placement of their advertisements in connection with particular keywords or keyword combinations. The amount they bid (e.g., cost-per-click (CPC)) is the amount that they are willing to pay for a click-through on their link. For example, in one PPC pricing strategy, if company A bids $1.10 for the keyword combination "baseball cards", then its advertisement can be placed above a company bidding $0.95 for the same keyword combination. Only a selected number of bidders' advertisements can be shown. The simplicity of the model makes it easy for an advertiser to understand why an advertisement is shown, and what bid is necessary to have an advertisement shown. It also means that advertisers are charged only for positive click-through responses.

Both Google and Overture offer tools to help users manage their bids. Google uses click-through rate and PPC to estimate an expected rate of return which is then used to dynamically rank the advertisements. Overture uses the PPC pricing strategy to rank advertisements, but monitors the click-through rate for significantly under performing advertisements.

Because Google dynamically ranks the advertisements based on click-through and PPC, advertisers cannot control their exact advertisement position with a fixed PPC. To insure a top position, the advertiser must be willing to pay a different price that is determined by their own click through rate as well as the competitors click-though rates and PPC. Overture uses a fixed price model, which insures fixed position for fixed price.

A number of third parties provide services to Overture customers to identify and select keywords and track and rank bids. For example, BidRank, Dynamic Keyword Bid Maximizer, Epic Sky, GoToast, PPC BidTracker, PPC Pro, Send Traffic, and Sure Hits. There are a small number of pay-per-bid systems. For example, Kanoodle is a traditional pay-per-bid system like Overture. Other examples, include Sprinks and FindWhat.

In the process of bidding in keyword auctions, advertisers may compete in ways that are mutually detrimental. There may be better joint strategies that are less costly, or involve alternative keywords, but the individual bidders do not easily discover these joint strategies. Even when the individual bidders know good joint strategies, the individual bidders may not have a strong incentive to pursue these strategies without some assurance of cooperation.

Conventional keyword bidding is primarily focused on click-through rate and PPC to estimate an expected rate of return for a particular keyword/advertisement combination. However, these keyword bidding systems have not considered the value of driving traffic to a particular host site and the subsequent activity that may be produced at the host site by that traffic. As a result, keyword bids by some seller/advertisers may have unrecognized value to the host site.

Thus, a computer-implemented method and system for keyword bidding in a market cooperative are needed.

BRIEF DESCRIPTION OF THE DRAWINGS

Embodiments illustrated by way of example and not limitation in the figures of the accompanying drawings, in which:

FIG. 5 illustrates an example of the metrics processed by the keyword aggregator of one embodiment.

FIG. 6 illustrates an example of the parameters generated as a result of the process described below for a sample Yahoo bidding strategy.

FIG. 7 illustrates an example of the parameters generated as a result of the process described below for a sample Google bidding strategy.

Figure 10:
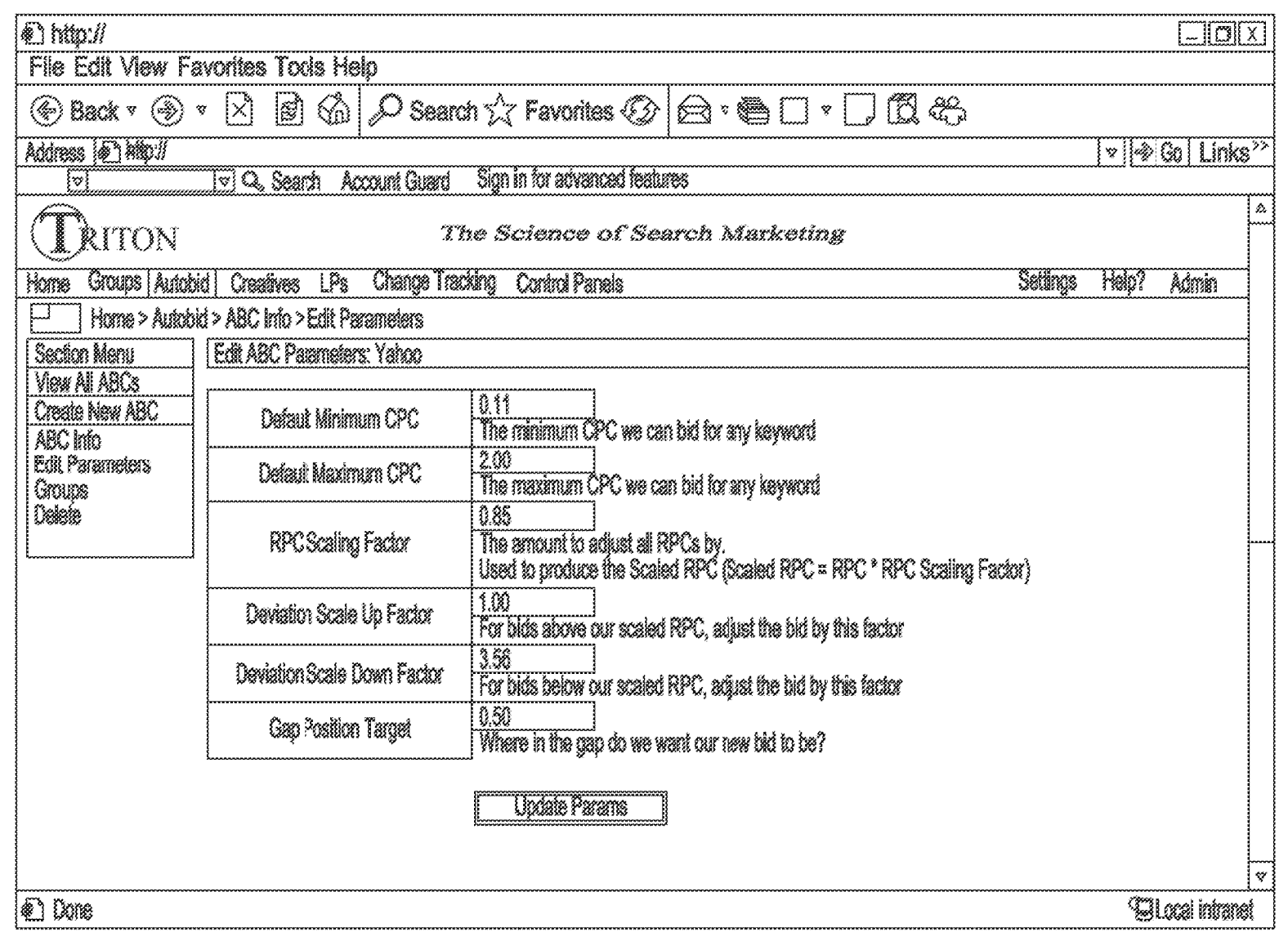
Figure 12:
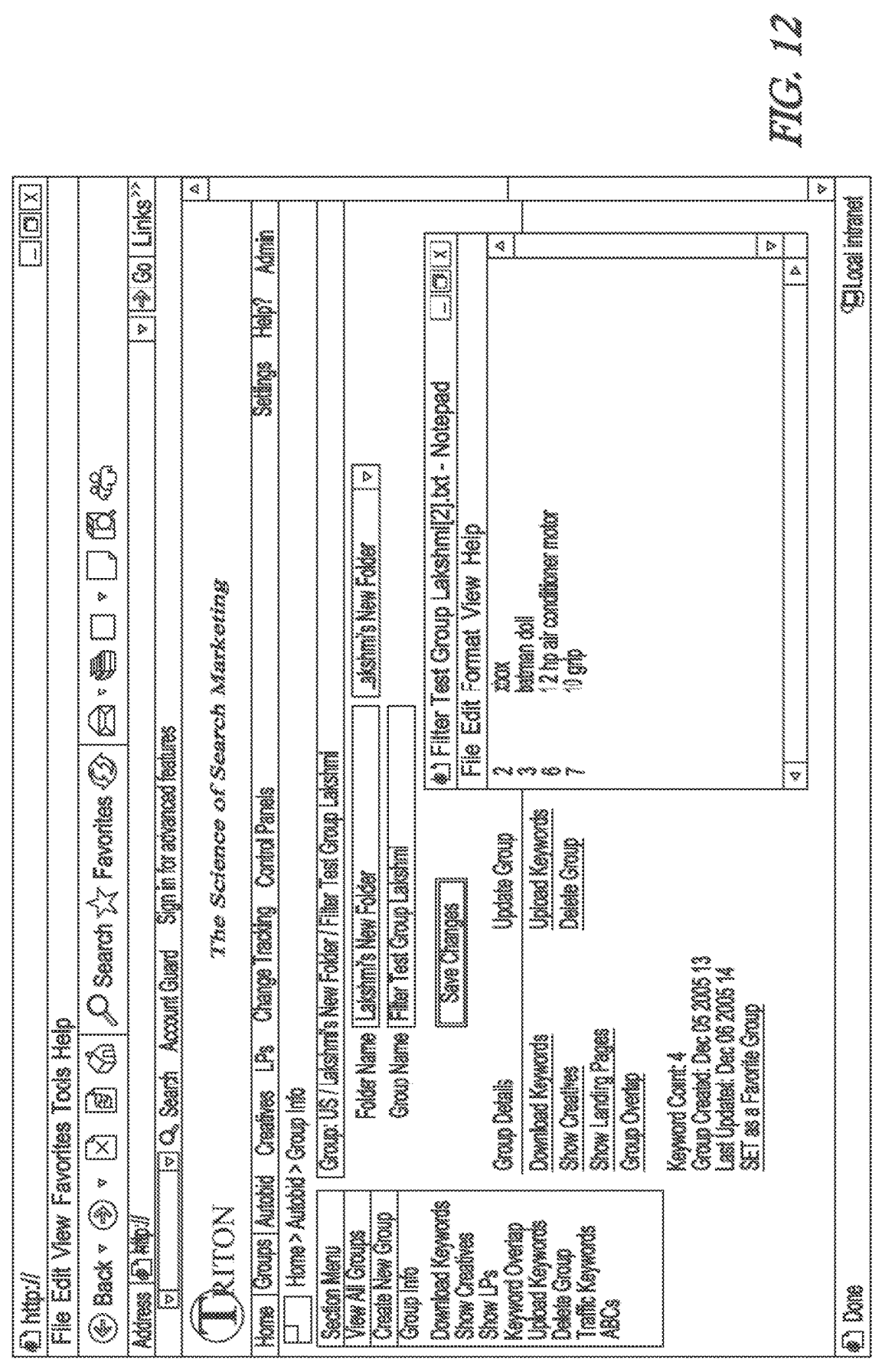

FIGS. 8-12 are sample screen snapshots of a user interface for an example embodiment for controlling parameters used in the automatic bid control system.

FIG. 27 illustrates an example of the Scoring and Ranking used for ad call processing in a particular embodiment.

DETAILED DESCRIPTION

Figure 1:
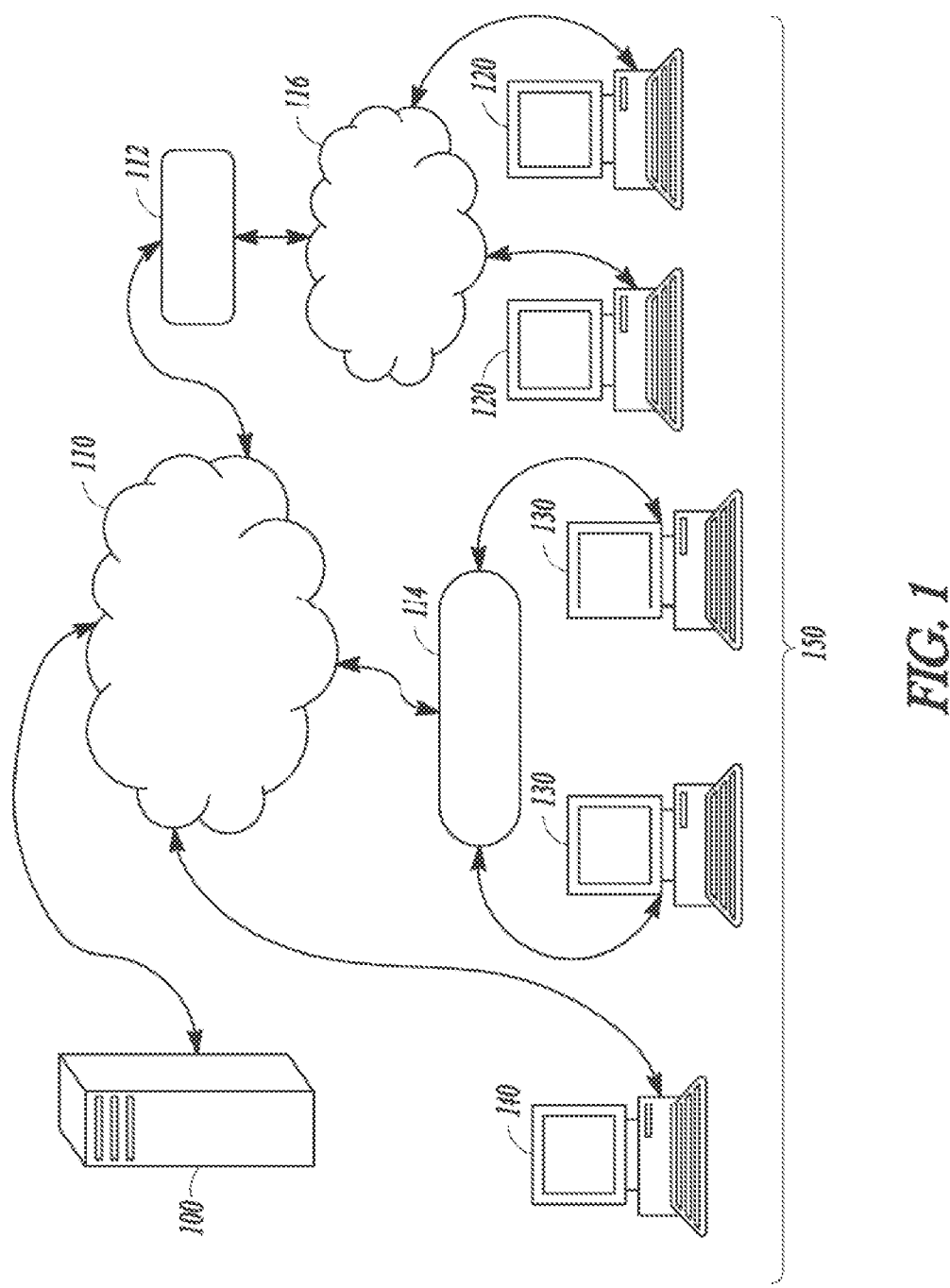
FIG. 1 is a block diagram of a network system on which an embodiment may operate.

A computer-implemented method and system for keyword bidding in a market cooperative are disclosed. In the following description, numerous specific details are set forth. However, it is understood that embodiments may be practiced without these specific details. In other instances, well-known processes, structures and techniques have not been shown in detail in order not to obscure the clarity of this description.

An example embodiment of a computer-implemented method and system may also be used to manage keyword bidding prices from a market perspective. Initially, a host may develop and maintain a portfolio of keywords for which users can bid. Additionally, a host can search and select desired keywords for the portfolio and cluster the keywords into logical groups based on a variety of dimensional metrics. A data mining process is used to implement keyword affinity scoring. Clustering combines keywords into logical groups or clusters that share a similar behavior with respect to a considered dimension. Keywords from an appropriate cluster can be used to modify an advertising creative. A creative can be a template advertisement or message into which a keyword can be inserted. Sources for clustering techniques include: (1) "ex ante" information about a keyword (linguistic similarity, number of words in the keyword phrase, supply-side categorization etc.); (2) performance metrics (costs, clicks, return on investment (ROI), competitor activity, use of item level metrics, etc.); (3) internal sources (e.g., host search query history, host catalogues, host listings parsings, host affiliate query, catalog, and listing information, international search strings, paid search queries, etc.); and (4) external sources (e.g. Googspy, Yahoo buzz, etc.

The computer-implemented method and system may also determine and use a correlation between different search queries in a single session. The correlation uses information based on the proximity of the different search queries and the subject matter searched in each query. For example, if a user submits a first search query (e.g. "John") and then subsequently in the same session submits a second search query (e.g. "John Smith"), a correlation can be drawn between those two keywords. This correlation can be used to form reasonable inferences related to the user behavior; because two related search queries appeared in sequence.

The performance metrics for a particular keyword or keyword cluster include a calculation of the value of user action based on keywords. The effective use of advertising or messaging as related to keyword search queries enables the host to attract user action as a result of keyword based advertising. The effectiveness of a particular keyword or keyword cluster to attract user action is a key performance metric. One measure of this effectiveness is a Revenue per Click (RPC) scoring. If a particular keyword or keyword cluster and a related advertisement or message causes a user to perform an action, e.g., click a link or icon, a certain value for that click through user action can be calculated using and RPC scoring. RPC scoring is based on a predicted value for a given keyword. The keyword scoring concept includes calculating the value of a new user brought in by a specific keyword or keyword cluster. In an example embodiment, as described below, additional data can be used to actually project a value forward in time. For example, a particular click-through might be worth $10 a click yesterday. However, there may be strong evidence the click-through is going to be worth $12 a click tomorrow, because of certain consumer variables that were observed (e.g., the volume of related listings may have skyrocketed, conversion rates may be skyrocketing, and actual sales prices—ASP's) are staying flat). Conversion is the act of a user clicking, responding, or otherwise taking action related to an advertisement or message. These consumer variables suggest that the keyword is going to be worth more tomorrow and into the future. In the example computer-implemented method and system, this forward looking analysis is done with the use of data mining and statistical analysis.

Revenue per Click Prediction Model

Revenue Per Click (RPC) prediction is one building block for keyword scoring and value prediction. For this reason, it is desirable that the model be as accurate as possible. At its core, the example RPC prediction process described herein is a statistical approach to ascribing the likely future revenue for a given click for a given keyword. There can be a large number of potential inputs to this RPC prediction, including: past revenue and past click volumes, COFA (Category of First Activity) for users who have converted on a given word, or the Bid Density by Category for a keyword historically. In the end, a large number of x-variables can be used as inputs to the model while only a few inputs may actually be part of the calculation. However, because the relative weighting of the various variables (and even the variables themselves) is likely to change over time, the example computer-implemented method and system provide an extensible and flexible approach towards the RPC calculations.

To best use the example RPC model, the input data to the RPC model may be updated on a periodic basis, thus incorporating the newest information. This periodic update can be implemented by interfacing the RPC model with the Keyword Selection Module and the Keyword Datamart (KWDM) described herein. The efficiency of the RPC model can also be improved if the RPC model receives warning alerts as soon as possible if there is a problem with the periodic retrieval of RPC model input data.

One theme of the RPC modeling is global scalability, which includes international country-specific models using the same methodology as has been implemented for the RPC model in the US. This implies that the RPC model may be based on readily available data sources in every country. Country-specific RPC models are implemented for individual countries and for individual search engines to improve the regional accuracy of the RPC modeling.

Data Sourcing

As part of the periodic (e.g. daily) input data gathering process, the RPC Predictive Model may pull in keyword/user/category data from various internal and external sources that have been identified as potential predictors of a host's keywords' RPC and number of clicks. Various sources for this keyword data can originate. Specifically, the keyword data can originate through the Keyword Testing Complex.

The Keyword Testing Complex is a shorthand name for the sourcing, selecting, adding, reporting, and deleting keywords cycle. The principal aim of this functionality, as described in detail below, is to facilitate the adding of good keywords and deleting of bad ones, provide control and reporting so users can easily run tests to determine the heuristics that matter in keyword selection and retention, and enable the automation of as much of the keyword testing, selection, and retention cycle as possible.

Figure 3:
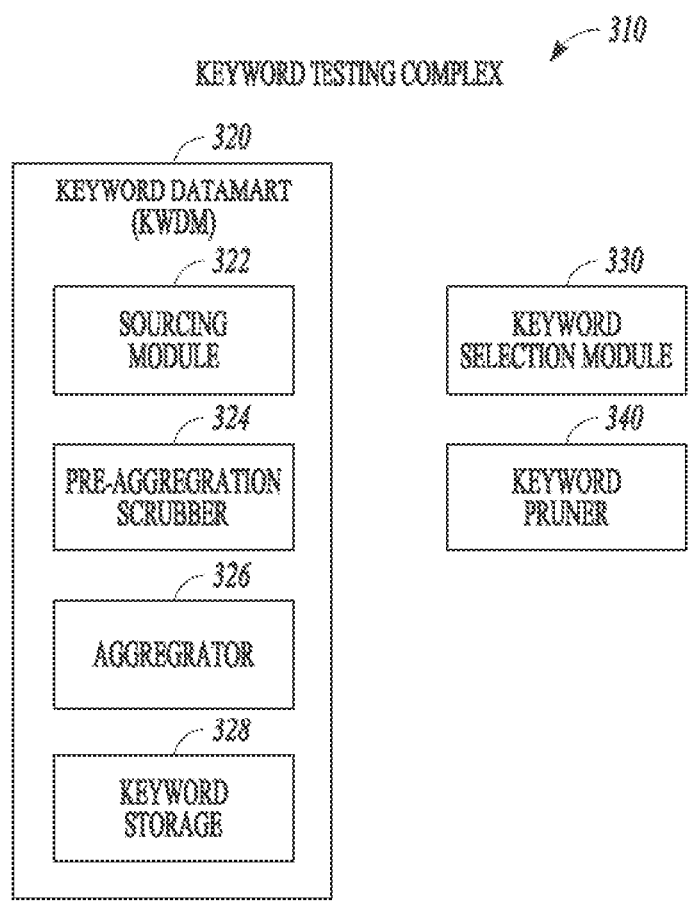
FIG. 3 illustrates the structure and components of the Keyword Testing Complex of one embodiment.
Figure 4:
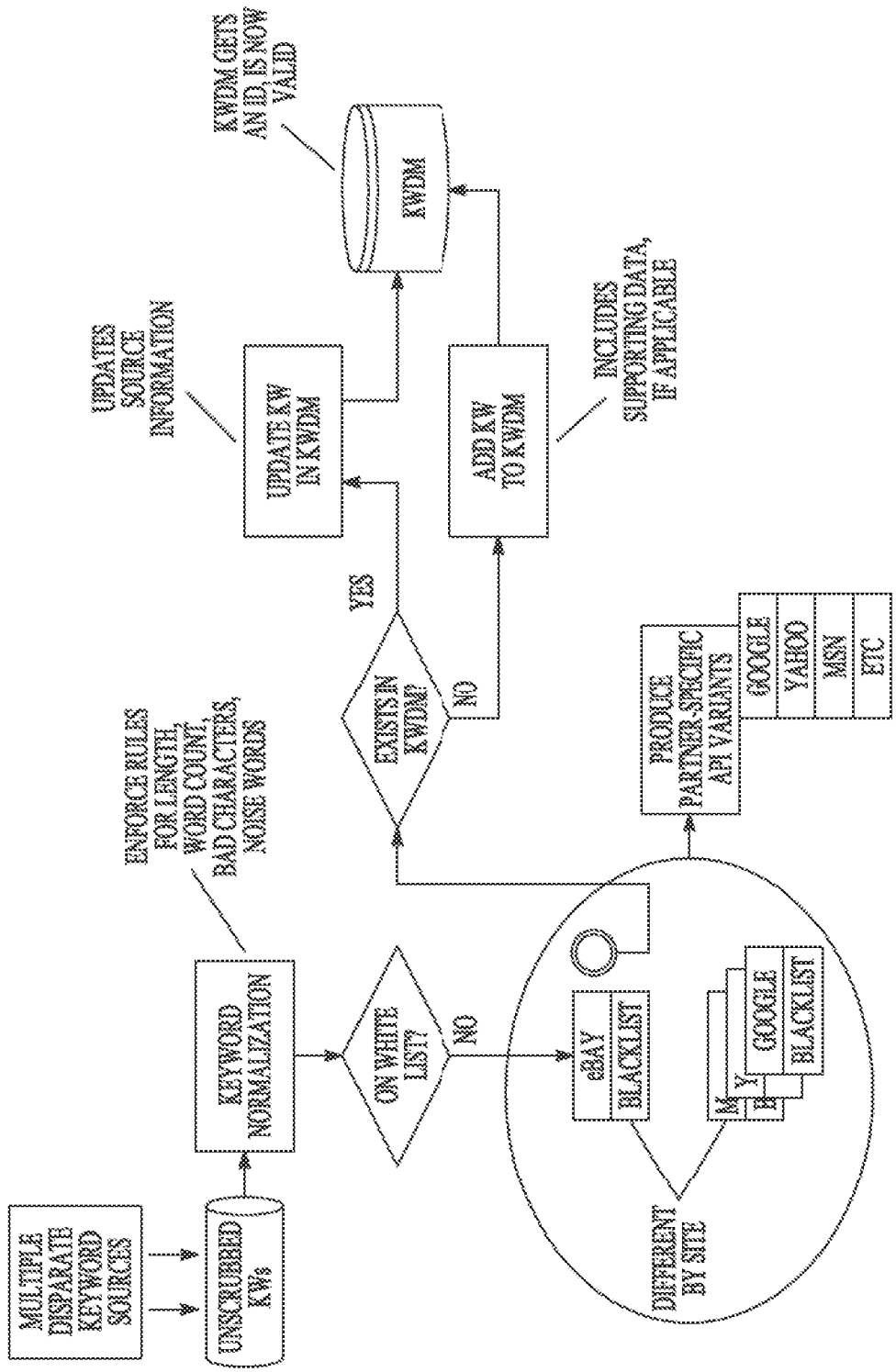
FIG. 4 illustrates the structure and flow of the keyword scrubbing module of one embodiment.
Figure 11:
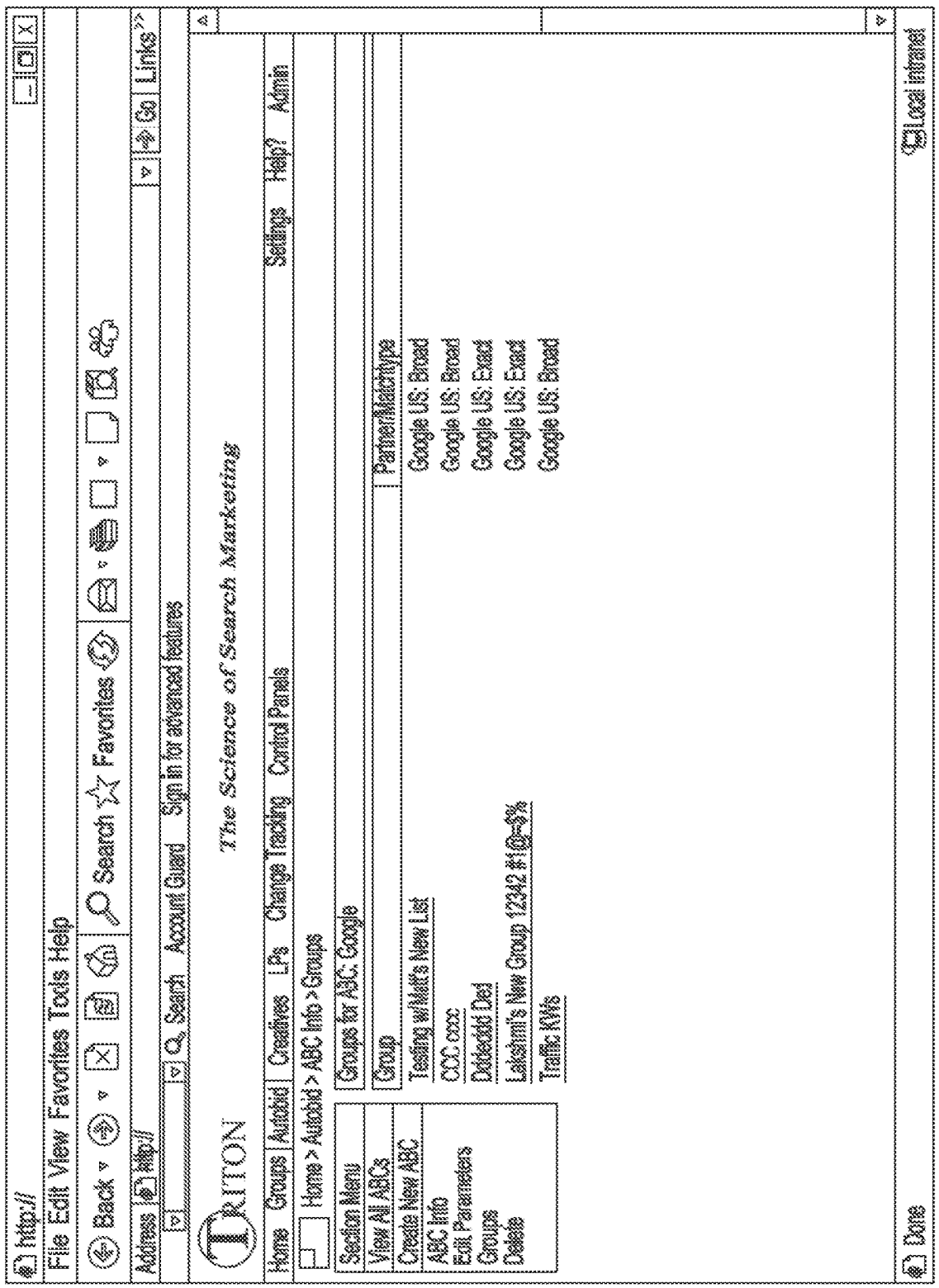

Referring to FIG. 3, a diagram illustrates the main components of the keyword test complex, according to an example embodiment. The keyword test complex 310 includes a keyword datamart, 320, a keyword selection module 330, and a keyword pruning module 340. The keyword data mart, 320 includes a sourcing module 322, a pre-aggregation scrubber 324, an aggregator 326, and keyword storage 328. The components of one embodiment of keyword datamart 320 are described in detail below.

Sourcing Module

The Keyword Sourcing Module 322 regularly pulls in keyword data from various internal and external sources that have been identified as potential sources of potentially revenue-generating keywords. Because each data source may have different dimensions and attributes, a generic and extensible data model is required. It is unlikely that many configurations settings or controls may be required to support keyword sourcing. A user of the technology described herein, denoted as a host, can use the Keyword Sourcing Module 322 to collect an initial unfiltered set of keywords from various sources. The following are some examples of important keyword sources that can be used. It can be apparent to those of ordinary skill in the art that other sources of keywords can similarly be used. Also note that there may likely be additional keyword sources that are important to various companies, organizations, countries or regions.

Internal—Host individually
    Host search query strings
    Host searches
    Host listing parsings
    Host catalogue listings
    Add a combination module as a list expansion tool (for instance have a list of action keywords (buy, cheap etc.), then match it to a give category, or combine keywords from different sources Internal—Host combined with $3^{rd}$ parties
    Affiliate query strings
    Natural search query strings
    International keywords
    Paid Search query strings External: (Well known sources of keywords, e.g.)
    Googspy
    Yahoo buzz Ad Hoc
    Generic User Upload utility for ad hoc keyword list additions
    "Keyword blender" which takes existing keyword strings and recombines the words into new keyword strings.
    Duplicate keywords may be allowed on Google if they have different Match Types as is currently available through the well-known Google interface.

As related to RPC modeling, keyword data can be sourced using the Keyword. Testing Complex and the Sourcing Module 322. In addition, other keyword data sources include the following.

Metrics (By Date/By Keyword):
    Cost
    Revenue
    Retention Bidders
    Retention Bids
    Acquisition Bidders
    Acquisition Bids
    ACRU's
    Clicks
    Average Position Keyword Categorization: (Bid Categorization for Top n categories)
    Category Percentage Weighting
    Site ID
    Meta Category
    Level 2
    Level 3
    Level 4
    Level 5
    Level 6

Search Categorization for Top n categories
  Category Percentage Weighting
  Site ID
  Meta Category
  Level 2
  Level 3
  Level 4
  Level 5
  Level 6
Prior Month by Category
  ASP—Actual Sales Price
  Conversion Rate
  Success Item Count
  Revenue
Category Data
  External Category Clustering
User Level:
  Sets—Retained Bidders, Acquired Users
  User
  Value
  RFM
  Zip
  CoFA—(Category of First Activity)
  Mosaic
  Demographic Keyword Data Aggregation Module (Aggregator)

Keywords in the KWDM 320 may contain various levels of dimension data. For example: 1) global dimensions (e.g. linguistic dimensions), 2) traffic dimensions (internal and external data), 3) clustering dimensions, and 4) source specific metrics. These dimensions are described in more detail below. Because many of these dimensions change from day to day, the aggregator 326 defines a time period of measurement for each metric. It may not be necessary to repopulate all of these metrics every day for every keyword. A weekly, monthly or quarterly refresh may be sufficient in some cases. A mechanism to track the source (and number of occurrences per source) by keyword is also a desired feature. As examples of dimensions (non-exhaustive):

a. Global Dimensions
    component words
    number of words
    "fingerprint": the keyword's words sorted alphabetically, so that "ipod mini" and "mini ipod" would map to the same fingerprint—this may be used to generate simple linguistic matches
    Part of Speech (noun, verb, adjective, etc)
    Similar to part of speech action words (e.g. buy, sell, etc.) allows for keyword combinations
    linguistic affinity matching (e.g. a score for keyword pairs which indicates their "likeness" based on the words they share)
    Predicted Revenue per Click (RPC) (from "best available" RPC model)
    number of host search results
    number of searches on yahoo in a time period
    Purged/Tested status flag
  b. Traffic Dimensions
    Trafficked on Search Engine xyz
    Sourced from Site abc
    By Search Engine
      Current Cost per Click (CPC) (bid) (if trafficked)
      Avg. CPC (last 30 days)
      Avg. Position (last 30 days)
      Cost
      Revenue
      Clicks
      Impressions
      Bids
      Confirmed Registered Users (CRU)
      Acquired Confirmed Registered Users (ACRD)
    Host Search Volume
  c. Clustering Dimensions
    Category Affinity (potentially multiple approaches)
    Value for Confirmed Registered User (VCRU) by keyword
    Revenue per Click (RPC) Predictive Model Score
      Predicted RPC
      Predicted Clicks
    Creative/Landing Page Cluster
    Metrics as required to support clustering
      User Metrics
      Category Metrics
  d. Source-Specific Dimensions (extensible)
    Affiliate queries
      Affiliate ID
    International
      Country
      Revenue
      Clicks
    Natural search
      Revenue
      Cost
    Host searches
      number of queries in prior unit of time
      number of bids resulting from word
      number of listings resulting from word
      Revenue resulting from word
    Query String map
      Map of query strings which have been associated with keyword strings in paid search data Referring to FIG. 5, an example of the metrics processed by aggregator 326 is illustrated. Because many of these statistics change from day to day, the aggregator 326 documents from what period of time the statistic is taken. It may not be necessary to repopulate all of these statistics every day. A monthly or quarterly refresh may be sufficient. For statistics involving the actual cost and revenue for the trafficked word for the host, the aggregator 326 incorporates new data with the old data. If a keyword comes in more than once from the same source, the aggregator 326 can increment the number in the appropriate source column. If the keyword is seen from a new source, the aggregator 326 increments the relevant source column.

Keyword Selection Module (Selector)

The Keyword Selection Module 330 is shown in FIG. 3. In one embodiment, there are two ways to select keywords to be added: manually and automatically.
  Manual method
    The user can run ad hoc queries on any of the fields to retrieve any set of keywords. Standard logic is supported (e.g. and, or's, joins, etc.).
    The user can sort according to any of the fields in the aggregator 326.
    The user can export the query result
    The user can create a list with the query results
    The user can save query parameters
  Automatic method
    The user can specify which metrics have been deemed to be useful predictors for valuable keywords (via heuristic testing or based on external models), and the keyword testing complex 310 then uses these criteria to automatically select keywords to be trafficked. This query can be generated by a configurable set of criteria that can be pre-set and executed at regular intervals.

Any other metric tracked by the aggregator 326 can be available as an input into the automatic keyword selector 330.

The computer-implemented method and system for keyword bidding disclosed herein provide a set of data-driven controls that allow users to manage keyword bidding prices at the keyword level and at a large scale. The computer-implemented method and system include a rules engine to manage the spend associated with purchasing and managing a keyword portfolio. The data-driven controls include controls to manage spend and high-volume. A few of the features of an example embodiment include the following:

The ability to update cost per click (CPC)/bid amounts for keywords across the entire keyword portfolio in an automated fashion at any time.

A host can update its bids on the entire keyword portfolio, while factoring in different user behavior at different times in the day (e.g. day-parting and the ability to raise bids right before lunch when online activity is the highest and lower the bids after midnight when activity is the lowest).

The ability to automatically control keyword bids to target a specific position and percentage factor above or below the current bid, based on what a host is willing to pay for a group of keywords.

Flexible architecture that supports multiple search partners. Example embodiments can support simultaneous bidding on different search partners (e.g. Google and Yahoo!) that have completely different keyword concepts and attributes and can easily scale to add new search partners (e.g. MSN).

Bid Optimization

CPC Bid Optimization of example embodiments described herein is an element to trafficking keywords and ensuring a host is maximizing its return on investment (ROI) on each keyword purchase. Because different search engines have different interfaces, policies, and rules associated with keywords and paid search opportunities, an automated bid optimization system may have to take these search engine-specific differences into account. Below are example considerations for search engine-specific bidding methodologies (e.g. Google and Yahoo!). Based on each search engine's current bidding methodology, specific business rules and a customized RPC Predictive Model has been created as part of the computer-implemented method and system described herein that can enable more efficient CPC bid optimization.

Example Yahoo! Search Marketing Bidding Strategy

Sample Components:
1. Input A: Scalable RPC per Keyword
2. Input B: Yahoo! Search Marketing Listing Attributes (e.g. keyword, title, URL, listingID, match type, etc.)
3. Input C: Competitor Bid Landscape
4. Bidding Logic
5. Output: New $CPC_{max}$ per Keyword to update API Input A:
The Scalable RPC per Keyword score can be produced using the RPC Predictive Model.

Input B:
A listing ID can be associated with every keyword in the host portfolio. Through an application programming interface (API), all attributes for each specific keyword in the portfolio can be made accessible to external systems. In an example embodiment, the specific API call is <GetListings>, where the following sample attributes can be returned. It can be apparent to those of ordinary skill in the art that a different set of attributes may similarly be returned:
Listing ID unique ID per keyword
URL—landing page
Category ID—Yahoo! specific category
Bid Type—default can be "auto"
Search Term—keyword
Minimum Bid
Title
Description
Market—Country
Content Bid—CPC of Content Match
Content Online
Content Opt In—Content Match on/off
Advanced Opt In—Broad Match on/off
Advanced Click Index
Click Index
Online—keyword on/off status
Bid—CPC Input C:
Through the API, a unique bidding landscape can be returned for every keyword in the portfolio. In an example embodiment, the specific API call is <GetMarketState> which returns the following sample parameters:
Listing Rank—position
Bid—CPC
Site Host—Advertiser's website Bidding Logic of an Example Embodiment Based on a current scaled TPC (target per click) value, use the Competitor Bid Landscape to determine a Bid value, Deviation=abs[TPC–$CPC_{(post\pm1,2)}$] (\$), and the position ±1,±2 relative to our current position. The TPC is a desired bid value the advertiser is willing to pay. Clearly, the advertiser seeks to optimize the TPC so the lowest value is paid while retaining an acceptable level of user click-throughs. The current position corresponds to a location on a search results page relative to the position of other advertiser's (competitors) on the same page in relation to the same keyword. Typically, a search engine can position a highest bidder's advertisement at the top (or in the position most likely to attract user click-throughs) of the search results page. The next highest bidder's advertisement is positioned just below the highest bidder's advertisement. This ranking continues until there is no space left on the search results page or the number of advertisements exceeds a search engine's maximum. In this manner, the search engine's advertisement placement corresponds to keyword bid values and the corresponding number of expected user click-throughs. As is well known, a search engine is paid the bid value by the advertiser for each user click-through.

For example, take the keyword example "maple wood". The bid landscape tells us that we are currently paying \$0.27 for position 3. "Position−1" places us in position 2 (a better position than position 3 in terms of the number of expected user click-throughs) with a maximum bid of \$0.27 and the deviation of ~\$0.03 from our scaled TPC of ~\$0.25. "Position−2" places us in position 1 (a better position than position 2 in terms of the number of expected user click-throughs) with a maximum bid of \$0.28 and the deviation of ~\$0.04 from our scaled TPC.

Using the bidding logic shown above, these metrics are determined for the two positions above and below the current position. From there, the minimum deviation is selected from the four surrounding positions. Once the optimal gap is determined, a new maximum CPC is determined based on the following:

If the Minimum Deviation lands the keyword between position 1 and 2, [new $CPC_{max}$=scaled. TPC]

If the Minimum Deviation lands the keyword between positions>2, [new $CPC_{max}$=$CPC_{hi}$-$0.01] or the default minimum of $0.10.

In all cases, the [$CPC_{actual}$=$CPC_{low}$+$0.01] and [$CPC_{ceiling}$=TPC*(1+X)], where X=scalable margin. FIG. 6 illustrates an example of the parameters generated as a result of the process described above for a sample Yahoo bidding strategy.

Output:

Using the process described above, parameters are generated for a sample Yahoo bidding strategy. These parameters can be used to create the XML syntax to make the appropriate CPC changes through the API.

Example Google Bidding Strategy

Sample Components:
1. Input A: Scalable RPC per Keyword
2. Input B: Previous Day's Bid per Keyword
3. Input C: Previous Day's Keyword Report
4. Bidding Logic
5. Output: New $CPC_{max}$ per Keyword to update through API Input A:

The Scalable RPC per Keyword score can be produced using the RPC Predictive Model.

Input B:

This input is used to determine if the host should continue paying its current CPC based on a specific position threshold. For example, with position thresholds of 1.5 vs. 1.0, a threshold of 1.5 can require the host to increase bids on more keywords than if our position threshold was set to 1.0.

Input C:

Through the API, the host can generate an automated report that returns the previous day's data for each keyword. Based on the time that the API call is made, the report can return [Current Time —12:00AM] hours of data. For example, the report may return the following parameters:

Campaign
Ad Group
Keyword
Keyword Matching
Keyword Status
Keyword Minimum CPC
Current Maximum CPC
Destination URL
Impressions
Clicks
CTR
Average CPC
Cost
Average Position Bidding Logic of an Example Embodiment Based on a current scaled TPC (target per click) value, use the previous day's $CPC_{max}$ and previous day's keyword-level data to calculate:

[$ Deviation]=[TPC-$CPC_{avg}$]     A.

[% Deviation]=[$ Deviation]/TPC     B.

Calculated $CPC_{max}$=(1+% Deviation)×[previous day's $CPC_{max}$]     C.

$CPC_{ceiling}$=TPC*(1+X)], where X=scalable margin     D.

The new $CPC_{max}$ may be calculated based on the following logic:

If (A=n/a), $CPC_{max}$=D

Otherwise, If (previous day's $CPC_{avg}$)>1.5, $CPC_{max}$=min (C, D)

Else if (previous day's $CPC_{avg}$)≤1.5, $CPC_{max}$=min(D, previous day's $CPC_{max}$)

New $CPC_{max}$ may be bounded by the following rules:

Final $CPC_{max}$=min[max(new $CPC_{max}$, Y), D]

Where Y=$CPC_{min}$ per keyword based on Google's QBB Implementation

For example, take the keyword example "longaberger pottery" and the corresponding sample parameters below,

A=0.52
B=78.7%
C=1.38
D=0.85

Based on the bidding logic above, since (A≠n/a) and [(previous day's $CPC_{avg}$)≤1.5] is true, then:

$CPC_{max}$=min(D, previous day's $CPC_{max}$)=min(0.85, 0.77)=0.77

FIG. 7 illustrates an example of the parameters generated as a result of the process described above for a sample Google bidding strategy.

Output:

Using the process described above, parameters are generated for a sample Google bidding strategy. These parameters, including the new $CPC_{max}$, can be used to execute the corresponding bid changes through Google's API.

Other Bidding Strategies

Variations of the bidding processes described above can be used to support other search engines. Further, a generic version of the bidding optimizer described herein can output or export a flat file for manual loading on other platforms. In addition, variations of the bidding processes described above can include time of day/hour optimization and demographic targeting.

Automatic Bid Control Management

FIGS. 8-12 are sample screen snapshots of a user interface for an example embodiment for controlling parameters used in the automatic bid control system. In the automatic bid control (ABC) system of an example embodiment, the process of controlling various bid parameters across a variety of search engines can be automated. Various thresholds, scaling factors, time periods, increment factors, and the like can be preset so the bid optimization process can be efficiently executed automatically and remain within preset bounds.

Match Type Automation

The Match Type Automation functionality provided in the computer-implemented method and system described herein enables a host to automate the decision-making process as to which keywords to buy on the different Match Types offered by the conventional search engines (e.g. Advanced/Standard match types on Overture, and Broad/Phrase/Exact match types on Google).

In particular, the functionality of the present computer-implemented method and system automates the decision-making related to:

Specifying which new user queries to buy on Exact/Standard Match.

Deciding when to change the match type from Advanced (Broad) to Standard(Exact Match), for the original keyword that led to the new user queries in (a).

Recommending the initial CPC (bid) to submit

In addition, the functionality of the present computer-implemented method and system also provides additional functionality. When submitting keywords to buy on a search engine, the user can specify the desired Match Type. The user can check the Match Type status of any keyword, list of keywords, or keyword cluster at any time. The user can also manually change the Match Type status of any keyword, list of keywords, or keyword cluster at any time. When an embodiment is about to switch some existing keywords from an Advanced match type to a Standard match type, the embodiment generates a report specifying the list of keywords that have been recommended to be switched over to Standard Match. The embodiment advises the user of the recommended changes prior to trafficking the changes. An example embodiment also allows the user to switch from Advanced to Standard match type automatically on a periodic basis (e.g. monthly). Alternatively, the match type switching can be configured to occur only after being accepted by the user, in the event the user wishes to review the recommended list of words first. This would enable the ability to override recommendations.

Some conventional keyword processing systems store even the slightest differences in user queries as distinct queries/records. For example, two phrases may have the same keywords, but one may have an additional space in the keyword string. Conventional systems create distinct records for these keyword variations even though these variations would be considered the same keyword in some conventional search engines Overture's Match Driver Logic), thus triggering the display of the same advertisements. Thus, it is beneficial to be able to mimic the Match Driver Logic of a particular search engine to the extent possible. The following pre-processing actions can be implemented to increase the likelihood that the keyword processing can mimic the operation of the Match Driver Logic of a particular search engine.

Singular/Plural: Treat all versions of user queries to be the same if they are singular/plural versions. In one embodiment, one can compare all the user queries with each other and convert all keyword variations to a common form (e.g. the singular form). Then for every record, compare the keyword with the user query: if the user query is a singular or plural version of the keyword, then set the user query to be the keyword. If it is not feasible (computationally expensive) to check all user queries against each other first, then the following actions can be implemented.

For each record, compare the keyword with the user query: if the user query is a singular or plural version of the keyword, then set the user query to be the keyword. Here are some of forms of singular/plurals that illustrate the user query conversion:
(ES)—beach vs. beachES
(S)—train vs trainS
(IES)—baby vs. babies
When moving a keyword to exact match, both versions (singular AND plural) can be provided.

Lower/Upper Case: Conventional systems store the same phrase separately if it was entered in lower case vs. upper case. An example embodiment converts all user queries to a common case (e.g. lower case).

Word Re-ordering: In one embodiment, all user queries are compared together before comparing them against keywords. In another embodiment, the user queries are checked to determine if they are simply a reordering of words of the keyword. If so, set the user query to be the keyword. For example, the user query, 'Paid Search Alley Rocks' would be made the same as 'Rocks Alley Search Paid'.

Filler words: The Match Type Automation functionality provided in the computer-implemented method and system described herein suppresses words such as 'and' '&' '+' 'the' 'a', space, and some special characters, etc.

Multiple spaces between words: if multiple spaces appear between words, the spaces are compressed to one space.

Quotation Marks around/within queries: Quotes (single or double quotes) can be removed from a user query.

Misspellings: In one embodiment, misspellings in a user query can be corrected.

Match Type Processing

The following actions can be used in various embodiments to process user queries and related keywords for various conventional search engines.

1) Retrieve all keywords from a search engine that had more than a threshold number of clicks (e.g. >=100 clicks) in a previous time period (e.g. 2 months).
2) Extract all user queries for each of the keywords in step 1 in a previous time period (e.g. two months).
   a. Also retrieve metrics such as the number of clicks and the number of bids for that keyword & user query combination/record.
   b. Delete any record that has a blank user query stored.
3) In the user query, replace any % XY characters (encoded Hex characters) with a blank.
4) As described above, mimic the Match Driver processing by performing the following actions in the following order. These steps may not be necessary for support of Google:
   a. Convert the keyword & user query to lower case.
   b. Replace '+' and '&' in the user query with blanks.
   c. Replace 'a', 'the' 'and ' in user query with blanks. (Note the padded pre & post spaces in these strings ensures these strings are not replaced if they are part of a word; they are only replaced if they appear between words).
   d. Delete any occurrences of single or double quotes in the user query.
   e. Compress multiple spaces between words to be one space.
   f. If the user query is a singular or plural version of a keyword, set the user query to be the keyword.
5) Group all records by keyword and user query. Get aggregate metrics at this level.
6) For each keyword, calculate and store the following fields:
   a. Count of number of associated user queries.
   b. Sum of clicks across all user queries.
   c. Sum of Bids across all user queries.
   d. Note that the sum of clicks or bids across all user queries for a given keyword, is not always the same as the number of clicks or bids for the keyword.
7) Based on the sum of clicks or bids across all user queries for a given keyword and given that the keyword level Costs & Revenue is known, assign costs & revenue (and thus profit) to each user query. Use the ratio of clicks/bids at the user query level, relative to the Total clicks/bids across all user queries for that keyword (as calculated in step 6 above) to allocate the appropriate amount of keyword Costs/Revenue to the user query in question.
8) Choose all user queries that were profitable and had a quantity of clicks greater than a configurable threshold of click activity (e.g. >=50 clicks) thereby ensuring a minimum threshold of 'popularity' for the user query. Buy these profitable user queries on Standard Match.

9) Set the initial recommended CPC for these Exact Match buys (e.g. 75%*user query_cost/user query_ clicks). Establish a floor bid value (e.g. $0.10) and a ceiling bid value (e.g. $0.75). In the event a profitable user query record is associated with more than one keyword, specify the initial CPC using the metrics of the most profitable record.

10) When buying these profitable user queries on Standard Match, check to make sure the user query is not the same as the keyword. In other words, leave the original keyword on Advanced so user queries can continue to be flagged, unless specified by the following checks. This step may not be necessary for support of Google as one can have the same keyword phrase on Broad & Exact match types simultaneously. If the number of clicks associated with the record where the user query equals the keyword is greater than a configurable percentage (e.g. 90%) of total clicks across all the user queries for that keyword, then buy that user query (and thus the original keyword) on Standard Match. If the original keyword is itself the most frequent user search query by far and generating almost all the clicks anyway, then it makes sense to buy the query on Standard Match, thus getting preferred status.

An Alternative Example Embodiment

A particular example embodiment includes an advertising platform, allowing sellers on a host site to buy and create advertisements for their items for sale and their stores selling items.

Figure 13:
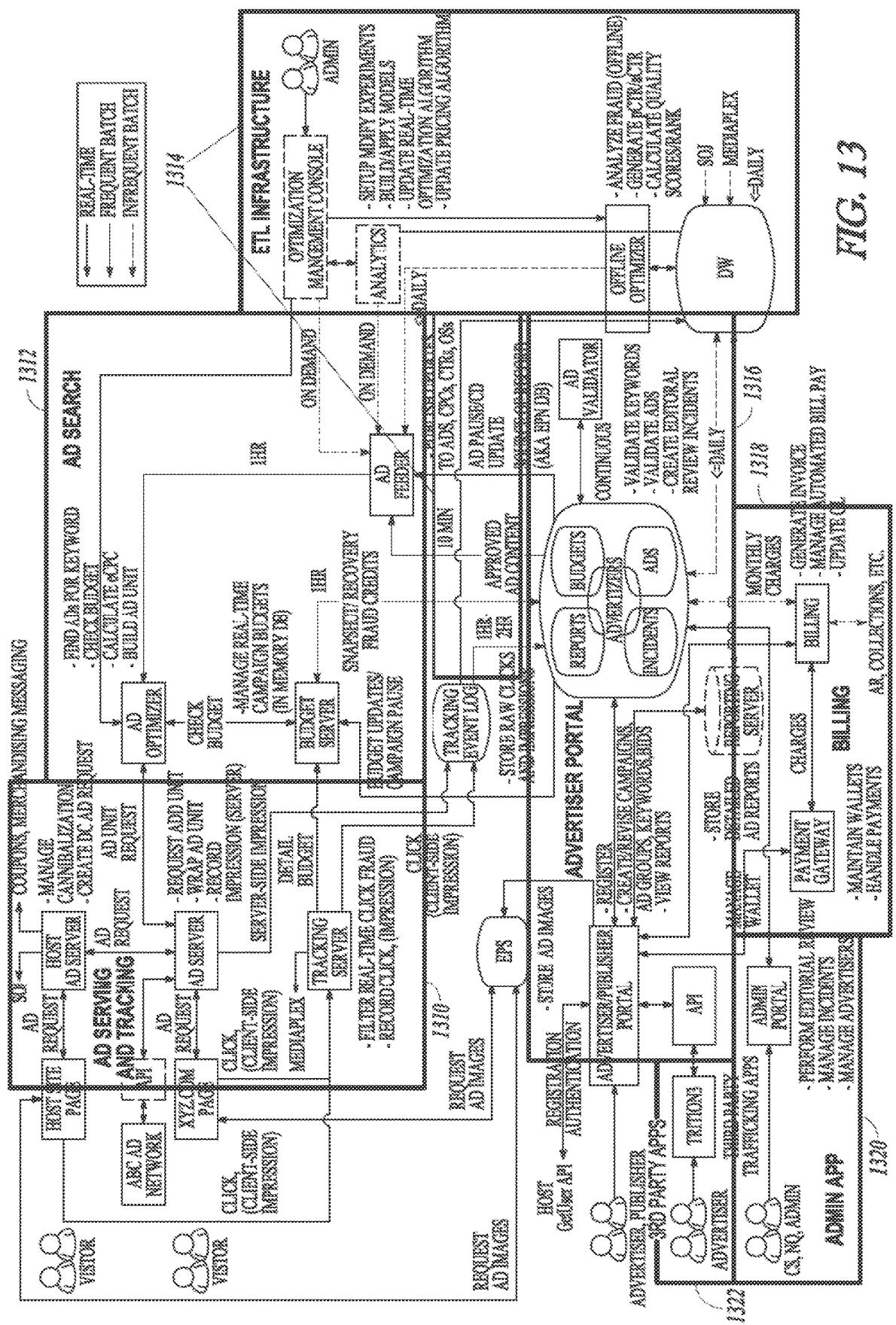
FIG. 13-15 illustrate an advertising platform of an example embodiment.
Figure 14:
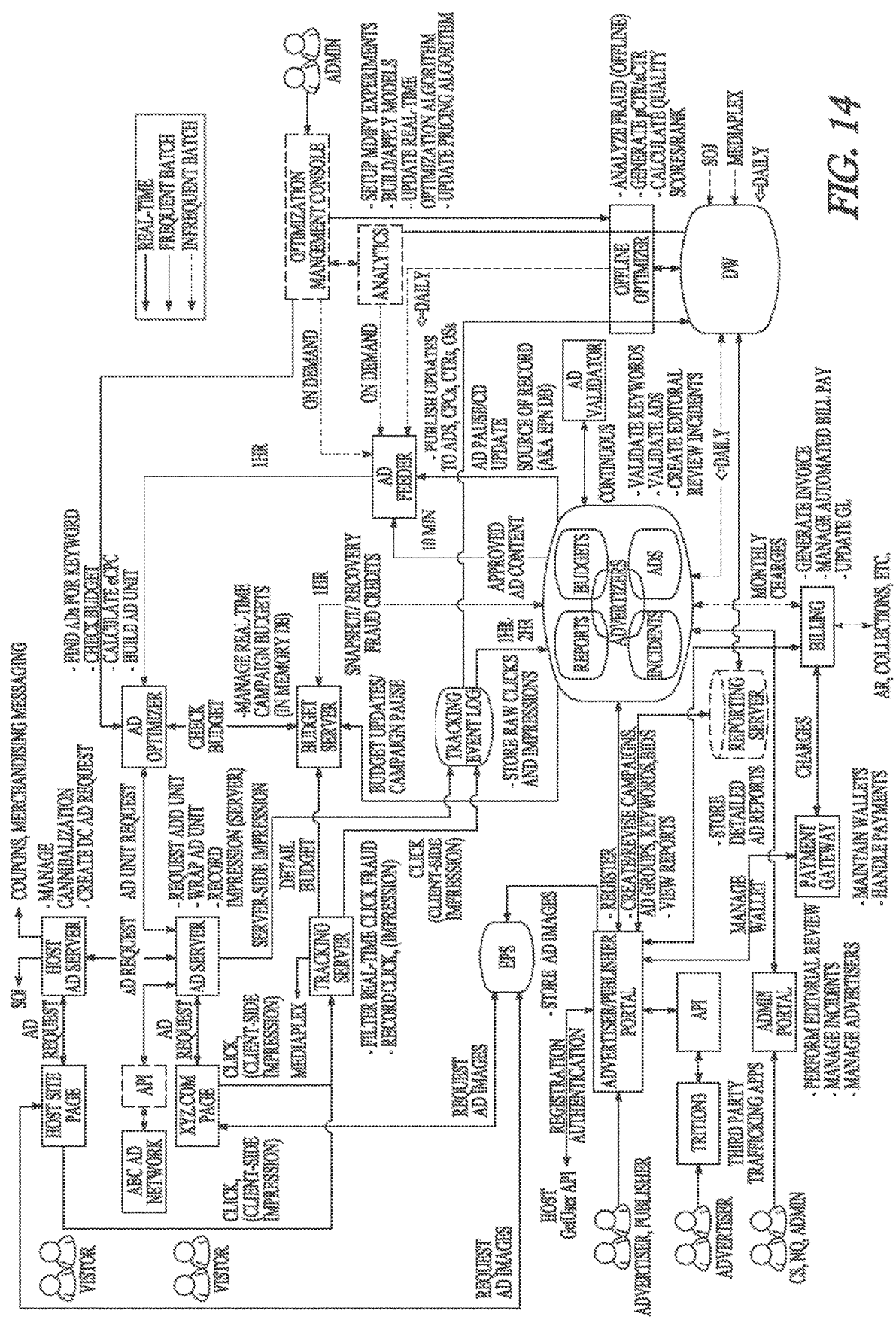
Figure 15:
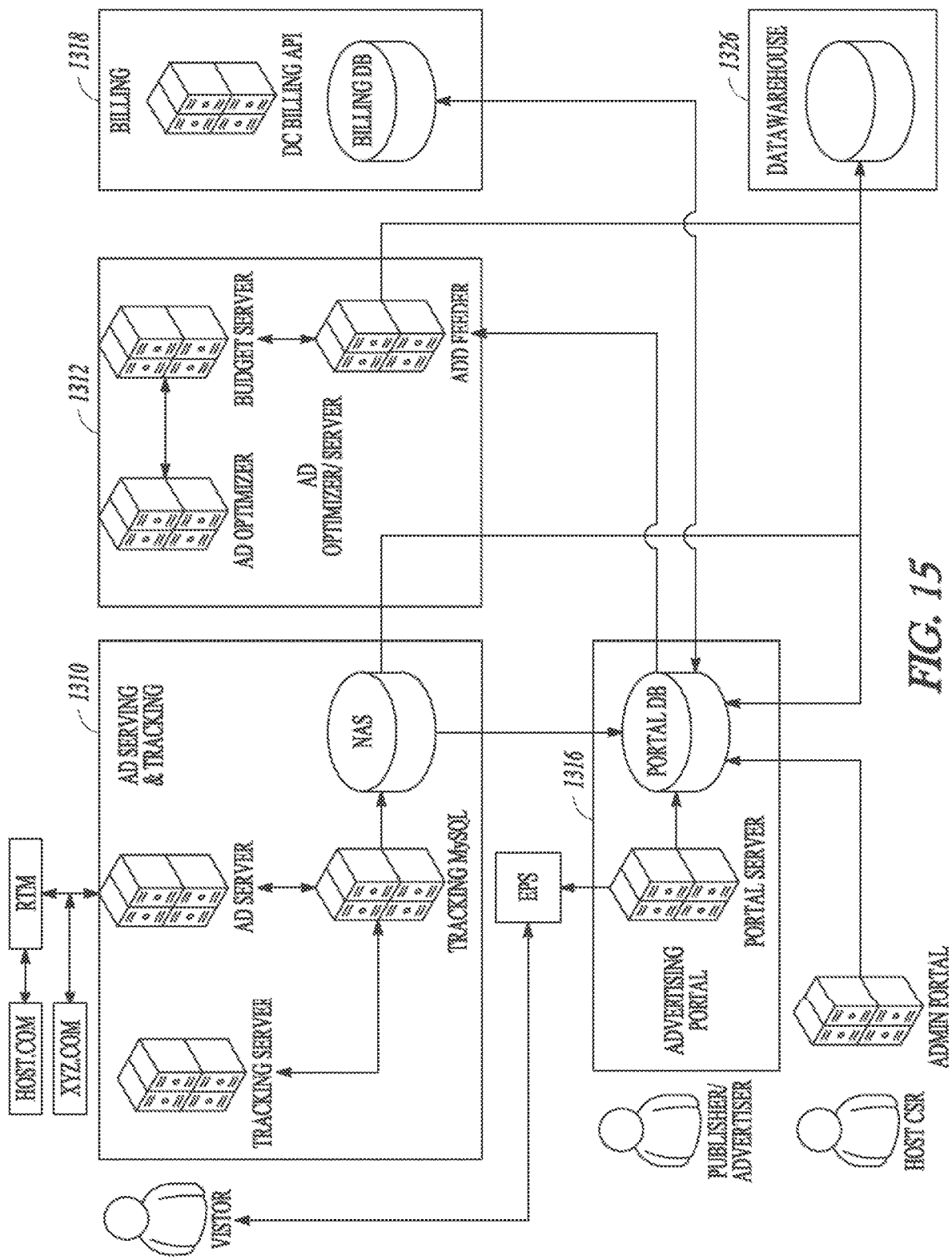

FIG. 13-15 illustrate an advertising platform of an example embodiment. The example advertising platform includes the following functional components:

Advertiser Portal (1316)—End user facing application. The Advertiser Portal can allow registered users to manage their Paid Search portfolio across various publishers. The portal user interface (UI) can support various functionality, including:
    Campaign creation and editing
    Adgroup creation and editing
    Keyword assignment
    Landing page assignment and modification
    Creative creation, assignment and modification
    Account management
    Reporting As shown in FIG. 13, the Advertiser Portal (1316) includes functionality for:
    i. User Registration
    ii. Account Dashboard
    iii. Create/Revise Campaigns, Ad Groups, Keywords, Bids
    iv. Create and edit Ads
    v. Manage Account
    vi. View Invoices
    vii. Make Payment Administrative Application (1320)—Customer Support and Program Administration
    i. Customer Support
    ii. Advertiser Directory
    iii. Manage Advertiser Accounts
    iv. Billing Credits and Corrections Billing (1318)—Send invoices, collect payments, and journal to SAP
    i. Collect Money
    ii. Generate invoices
    iii. Maintain payment history
    iv. Journals Ad Serving and Tracking (1310)—Show ads on publisher sites
    i. Host Ad Server: Receive Request to Display ads; Request Ads from Ad optimizer; Format Ads to display; Encode click links for tracking.
    ii. Tracking Server; Record clicks and associated cost per click; Record impressions; Track events via Mediaplex Ad Search (1312)—Find the right ads to show
    i. Budget Server: Manage Daily and overall budget caps
    ii. Ad Optimizer: Find Ads: Confirm Budget is available; and Rank/Optimize Ads
    iii. Ad Feeder: Get Ads from Advertiser Portal and put them in search Event Tracking Logic (ETL) Infrastructure (1314)—Track and aggregate all the data that drives the platform
    i. Collect tracking events and post to Advertiser Portal
    ii. Near real time click fraud
    iii. Aggregate Event data for reporting
    iv. Move data to Data Warehouse for offline processing
    v. Create data summaries for Advertiser Portal
    vi. Perform offline Analysis to continually optimize ads Third Party Applications (1322) Automated creation of distributed commerce campaigns for $3^{rd}$ party merchants.

Figure 16:
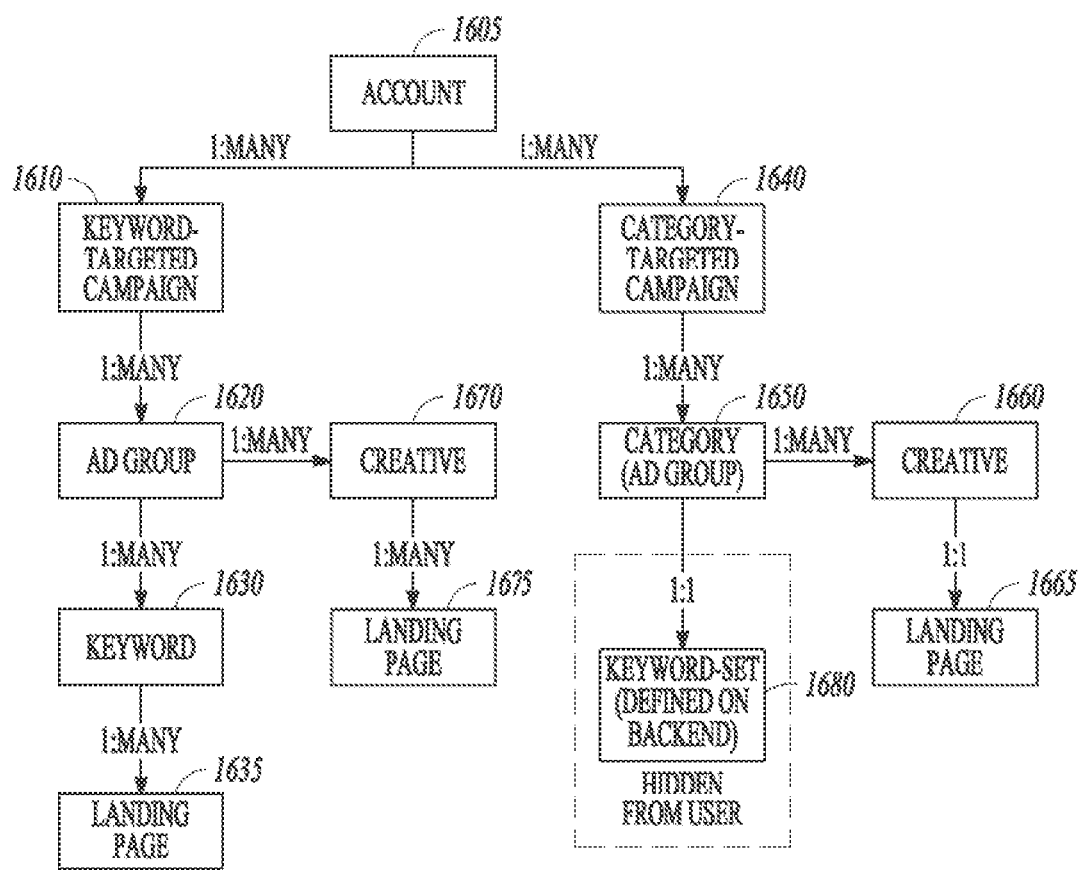
FIG. 16 illustrates a user account structure and hierarchy of a particular embodiment.

FIG. 16 illustrates a user account structure and hierarchy of a particular embodiment. The Ad Portal 1316 can provide an advertiser user interface (UI) and utilize an account and campaign structure that is shown in FIG. 16. From the Advertiser UI, users can have the ability to set the status for the various levels of their Account. Users can activate and pause (inactivate) the following:
    Campaign
    Ad Group
    Keyword
    Creative In addition, to support system and administrative functionality, administrative (admin) users and the system can have the ability to set statuses for the following:
    Account
    Campaign
    Ad Group
    Keyword
    Creative In addition:
    Statuses set by admin users can only be modified by admin users.
    Statuses set by the system can be only modified by the system or by admin users.
    Statuses set by users can be modified by users, the system or by admin users.
    Statuses set at higher levels in the hierarchy cannot propagate down to lower-levels. For example, if a Campaign is switched to an inactive status, it is possible for Ad Groups to remain in an Active Status. Therefore, restrictions set at higher levels in the hierarchy should take precedence over statuses set at lower levels.

The Advertiser Portal 1316 can ultimately support a wide-variety of ad formats, including rich media, and can be designed to support this type of scaling.

Account Overview (Main Page)

The Account Overview is the page that can be displayed to the user when they first log-in. The page can contain a snapshot of their account, including the following:
    System-generated UI Alerts
    Account Status
    Account Performance (key metrics
        Number of impressions Number of clicks
Average CTR
Average CPC
Average CPM
Budget Spent (Cost)

Users can be allowed to toggle start and end date fields to control the range of the Account Performance metrics.

Campaign Management

Account Dashboard (Campaign Summary)

From this page, users can see a list of the Campaigns that have already been set up along with various metadata and metrics. The following data can be displayed:

Campaign Status
Campaign Name
Number of impressions
Number of clicks
Average CTR.
Average CPC
Average CPM
Average Position
Max daily budget
Budget Spent (Cost)

There can also be an 'Edit Campaign' link for each saved Campaign. Clicking on a Campaign Name can forward the user to its Campaign Dashboard. The users can have the option to delete campaign(s) from the Account Dashboard. Deleting a campaign can remove the campaigns and all ad groups within that campaign from the dashboard view and the system permanently. User can be prompted for delete confirmation "Are you sure you want to delete?" before the deletion takes place. Aggregated reporting data can be available as a summary of all deleted objects on all Dashboards. Pausing a campaign suspends activity on all Ad Groups contained within that campaign. Users can still modify campaign attributes while it is in a paused state. The Campaign list can be filtered by 'All' (default) or 'Active Only'. Users can also specify a date range for the metric calculation. The list can be sortable by all fields. The page can have multi-select checkbox functionality to allow users to make status changes to multiple campaigns at once—including activation, pausing and deletion. Users must confirm all status changes (pop-up alert) before they are applied.

Campaign Dashboard (Ad Group Summary)

From this page, users can see detailed data for a saved campaign, including:

Campaign Name
Campaign Description
Campaign Status
Campaign Type
Targeted Country
Start date
End date
Max daily budget
Total Spend (Cost)

The Campaign Dashboard can also display a list of Ad Groups saved for that account along with detailed data for each, including:

Ad Group Name
   This can be the Category name for category-targeted campaigns.
Ad Group Status
Default Max CPC (Bid)
   For category-targeted Ad Groups, this can be the Current Max CPC
(Bid)
Number of impressions
Number of clicks
Average CTR
Average CPC
Average CPM
Average Position An 'Edit' link can also be displayed for each Ad Group that can forward the user to the 'Edit Ad Group' flow. Clicking on the Ad Group Name forwards the user to the Ad Group Dashboard. Users can have the option to delete ad group or category from the Campaign Dashboard. Deleting an ad group can remove the ad group and all keywords within that ad group from the dashboard view and the system permanently. User can be prompted for delete confirmation "Are you sure you want to delete?" before the deletion takes place. Reporting data can be available as a summary of all deleted ad groups on Campaign Dashboards.

Create Campaign

On the 'Create Campaign' page, users can have the ability to create one new campaign at a time. Users can be prompted for the following information:

Campaign Name
   Must be unique within account
Campaign Description
Campaign Type
   Keyword or Category
Targeted Country
   Germany or US (single-select only)
Targeted Language
   German or English (single-select only)
Start date
   Default: current date
End date
   Optional
Max daily budget The daily budget (along with all other monetary parameters) can utilize the currency set at the account-level. The optimization engine infrastructure can be designed to allow multiple targeted countries per campaign. Clicking on the "Continue" button can forward the user to following:

'Create Ad Group' flow if the campaign is keyword-targeted
'Target Categories' flow if the campaign is category-targeted Edit Campaign From the Campaign dashboard, users can have the ability to click an 'Edit' link for each saved campaign. From this page, users can be allowed to edit the settings for individual Campaigns, including:

Campaign Name
Campaign Description
Start date
End date
Targeted Country
Targeted Language
Max daily budget
   Budget changes can be reflected the next day. Therefore, if users wish to stop campaign activity immediately, they must use the Campaign status feature.

Users cannot be allowed to edit the campaign-type setting (from keyword to category, or visa-versa). Users can have the ability to change the Country that is targeted.

Ad Group Management

Ad Group Dashboard

From this page, users can see detailed data for a saved Ad Group, including:

Ad Group Name
Ad Group Description
Ad Group Status

Creative preview (including Landing Page)

From this page, users can also manage the status for creatives (active or inactive) and delete creatives. Users can also view keyword-level data for keyword-targeted Ad Groups, including:

Keyword
Matchtype
Keyword Status
Number of impressions
Number of clicks
Average CTR
Average CPC
Average CPM
Average Position Users can also click a Bulk Edit link. After clicking the link, the following data in the keyword reporting table can be displayed as an editable text input box:

Max CPC
Landing Page

The data above cannot be displayed for Category-targeted Ad Groups. Instead, the following data can be displayed:

Category name
Tree Level
Category status
Current bid (Max CPC)
Number of impressions
Number of clicks
Average CTR
Average CPC
Average CPM
Average Position Create Ad Group From the Create Ad Group flow, users can have the ability to create new Ad Groups for a campaign. The creation process can differ for keyword-targeted and category-targeted campaigns.

New Ad Group for Keyword-Targeted Campaigns

Users can have the ability to create one new Ad Group at a time for keyword-targeted Campaigns. During the Ad Group creation process, users can have to enter basic Ad Group information, enter keywords to associate with the Ad Group and finally create the advertisements (creatives) to associate with the Ad Group. During the first step of the Ad Group creation flow, users can be prompted for the following basic information:

Ad Group name
Ad Group description (optional)

Users can also enter a list of keywords into a free-form text box one keyword per line—and enter a default Max CPC value for the set of keywords. Keyword tagging (board and exact) can be supported in the Ad Portal to indicate matchtype (exact match keywords can be contained within double quotes). All keywords can be normalized as follows (with no notification to the user):

Converted to lowercase
Duplicate whitespace removed
Leading and trailing whitespace removed
Only the following characters are allowed in keyword strings in a particular embodiment:
Allowed special characters: . ' / - <space>
Allowed German characters: ä é ö ü ß
Allowed alphanumeric characters: a through z, 0 through 9.

Inclusion of any special characters not on the lists above can trigger an error message. If a user enters a duplicate with the same matchtype in the list of keywords when creating or editing an ad group, the duplicate can be dropped and no error message can be displayed.

After clicking the 'Continue' button, users can be forwarded to the next step where they can have the ability to create advertisements (Creatives), which includes Ad text, an Ad image (optionally) and a destination URL (Landing Page) for the Creative. Upon choosing a Creative-type, users can be presented with a form to enter their Creative details. For each creative, users can enter the following fields:

Title (required)
Description (line 1) (required)
Description (line 2) (optional)
Display URL (required)
Should not include the "http://" or "https://" portion of the URL
Destination UAL (required)
Should include the "http:" or "https://" portion of the URL

| Field | Minimum Size (chars) | Maximum Size (chars) |
| --- | --- | --- |
| Title | 1 | 55 |
| Line 1 | 1 | 37 |
| Line 2 | 0 (optional) | 37 |
| Display URL | unlimited | unlimited |

In addition, we should verify that the specified Destination URL is a valid link, and the domain of the Display URL matches the domain of the Destination URL. They can also have the option to upload an Ad Image for the creative. Uploaded images can be automatically resized and formatted in-line with publisher ad image requirements before being stored in the server. The link to the image on the server can be stored in the Ad Portal database. Users can have the ability to optionally insert a {keyword} replacement tag within their creative text that can be substituted with the keyword string (not the search string) before being served. However, a {keyword} replacement tag may not be supported for category campaigns.

Users can specify their keyword insertion criteria by inserted the following into their creative text (headline, line 1, line 2 and/or display URL) and Landing Page field at the Creative level: {param1:param2} param1 can be used to indicate that this is a keyword substitution tag and may have one of the following values (to indicate capitalization rules):
Keyword—Capitalize only the first letter of the keyword string
keyword—Do not capitalize any part of the keyword string
KeyWord—Capitalize the first letter of each word of the keyword string
KEYWORD—Capitalize the entire keyword string
If any other format is specified an error should be displayed to the user.
param2 is the backup string and is used if the keyword cannot be inserted into the creative text. Currently the only event that triggers this condition is if inserting the keyword string into the creative causes that part of the creative to exceed the length limit. In the future it could be triggered by other conditions (trademark rules, etc.)
A backup string is required, but the user can elect to have a blank substituted as the backup by entering {keyword:} Backup strings can consist of multiple words, for example {keyword:Nokia Cell Phones}

Backup strings are interpreted explicitly (capitalization rules are not applied).

The creative (not the keyword) special character restrictions also apply to backup strings.

Leading and trailing spaces in the param2 field should be automatically trimmed by the Ad Portal without notification to the user (and before testing field length rules).

Creative field length restrictions should be applied by the Ad Portal by comparing the summed character count of the backup string plus the non-tag portion of the creative text against the limit. For example, the creative line, "Looking for {keyword:cool stuff}" should be considered to have 22 characters. If the length restriction is exceeded, a message should be displayed to the user. In a particular embodiment, only the following special characters are allowed in creative strings:

Allowed special characters: # S & _ - " [ ] ' + . , / : % ? ! ® ™ <space>
Allowed German characters: ä Ä é ö Ö ü Ü ß € « »
Allowed alphanumeric characters: A through Z, a through z, 0 through 9

Inclusion of any characters not on the lists above should trigger an error message. For both creative- and keyword-level landing pages, the domain of the display (friendly) URL must match the domain of the destination URL. This rule can be enforced by the Ad Portal. In addition, if the Destination URL is for a host item listings page, a call to a host API can be made to ensure that the item has been approved. After the user has entered data for a creative, they can have the option to either 'Continue' (if they do not need to add any more Creatives) or 'Save and Create New'. If they click the latter, the saved preview for the Creative can be displayed at the bottom of the page (along with any other saved creatives), and the user can have the ability to repeat the process to add another Creative. In a particular embodiment, we can allow five creatives per Ad Group (with the ability to increase this limit to 10). After the user has entered their last Creative, they can click the 'Continue' button to proceed to the keyword-level data setup page.

After clicking the 'Continue' button, users can be forwarded to the next step where they can have the ability to optionally alter the CPC value and landing page for each of the key word-matchtypes they entered earlier. Keyword-level landing pages are optional—if a user has not chosen a keyword-level landing page for a particular keyword, the creative-level landing page can be used instead. Keyword-level Max CPC values are optional—if a user has not chosen a keyword-level Max CPC for a particular creative, the Ad Group-level Default Max CPC can be used instead. At this point the user has completing entering all of the necessary information for their new Ad Group. During this last step, users can have the ability to review the details of their Ad Group to make any necessary changes before they click the 'Create' button to complete the process. By clicking "Create", user can be prompt with "create another ad group?" option. If user chooses "yes", user can be directed to create a new ad group within the same campaign; selecting "no" can direct users to campaign dashboard.

Ad Groups for Category-Targeted Campaigns

The Ad Group creation process for category-targeted campaigns can be designed to facilitate multi-category targeting. From a single flow, users can have the ability to associate multiple categories with a single set of Creatives. Users can have to go through the creation flow for each distinct Creative Set that they wish to create. The application can create one new Ad Group per category.

During the first step of the Ad Groups creation process, users can be prompted to select the categories for targeting. Users can have the ability to navigate through the Ad Portal category tree structure and add categories to the targeted list. Tree level can be shown wherever category name is displayed. In addition, users can have the ability to specify a default CPC that can be applied to all Category Ad Groups (they can modify this on a per-category basis later). After clicking the 'Continue' button, users can be forwarded to the next page in the flow—CPC selection. On this page, users can select a Max CPC value for each of the categories selected in the first step. The next step in the process can be the Creative Set and Landing Page selection. The UI for this page can be the same as the corresponding page in the keyword-targeted Ad Group flow.

At this point the user has completing entering all of the necessary information for their new category-targeted Ad Groups. During this last step, users can have the ability to review the details of their Ad Groups to make any necessary changes before they click the 'Create' button to complete the process. The application can create one Ad Group per selected category. Users cannot have the ability to assign keywords to category-targeted Ad Groups. Instead, the application can maintain a keyword list for each category. This list can be hidden from the user completely. The application can manage optimization and external partner bidding at the keyword-level (with the Ad Group-level Max CPC bid used for all keywords), but all category-targeted reporting (both UI and downloadable reports) can be summarized at the Ad Group (category) level.

Ad Portal Category Hierarchy

The Ad Portal can leverage the host product/service category structure, with the following assumptions:

A distinct category structure can be maintained for each country, and can be displayed conditionally based on the country selected at the Campaign-level New categories can be added at any time, but categories cannot be edited or removed.

Optimization for Category-Targeted Ad Groups

We can assume the following:

1) Category-targeted ads can be in play with keyword-targeted ads when a search query is available during real-time optimization.

2) Only category-targeted ads can be displayed when users are browsing host listings (no search query is available).

It is assumed that the real-time optimizer can only optimize for a keyword (search query string), not category, therefore:

In order to support the first requirement (search use case), the Ad Portal can maintain a mapping of Ad Portal Category to Keyword list. If user bids on a category, the offline optimization engine can treat it as if they bid on that entire keyword list utilizing the Max CPC set at the category (Ad Group) level and the Broad matchtype. This concept of keyword-targeting for category-targeted Ad Groups can be hidden from the user and no reference can be made to it in the user interface.

In order to support the second requirement (browse use case), the Ad Portal can maintain a mapping of a category token keyword to each Ad Portal category.

A hash function applied to the Ad Portal category ID and the targeted country code can be utilized to generate each category token keyword. During real-time, the hash function can also be utilized by the Ad Server to translate the host category ID and site ID (translated into the country code) passed by the publisher into a keyword string (when no search string is available).

This keyword can be treated as an Exact match keyword.

The Ad Portal can distinguish between the two category-keyword mappings above so that they may be interpreted differently by the Offline Optimization job.

Edit Ad Group

For both keyword-targeted and category-targeted campaigns, users can only have the ability to edit one Ad Group at a time. When selecting the 'Edit Ad Group Settings' link from the Ad Group dashboard, users can be forwarded to a page where they can modify the following Ad Group settings:

Default CPC
Creatives
Keyword list (keyword-targeted Ad Groups only)

Users cannot have the ability to edit the category setting in category-targeted Ad Groups. Edit Creative can be treated as delete existing creative and adding a new one. Performance data for the edited creative can be lost. Edit Landing Page is considered an update (but not delete/add) and performance data can be maintained.

Edit Keyword

From the Ad Group dashboard, users can have the ability to click on individual keywords to modify their properties. From the Edit Keyword page, users can modify the following:

Status
Max CPC
Landing Page
Matchtype
Minimum and Maximum Bid

There can be minimum bid and maximum bid set at the portfolio level for both keyword and category Max CPC (cost per click) and can be stored in US dollars in the database. In addition, there can be minimum bid sets for individual keyword Max CPC and can be stored in US dollars in the database. During Ad Group creation, there may not be a validation on the UI (user interface) for the keyword Max CPC entered by user against portfolio-level minimum/maximum bid and keyword-level minimum bid. Once the Ad Group is saved, Max CPC for each keyword (if no Max CPC is defined for the keyword, use Ad Group's default Max CPC) can be checked against portfolio-level minimum/maximum bid and keyword-level minimum bid, lithe Max CPC is higher than the maximum bid (portfolio), an error message can be shown: The Max CPC for the following [keyword/ad group] has exceeded the maximum allowable amount of [amount in local currency]: [keyword/ad group]

If the Max CPC is lower than either of the minimum bid (portfolio, keyword-level), the status of corresponding keyword can be changed to "inactive" with reason code "below minimum bid". There should be UI message "Please increase your Max CPC for this keyword" next to the corresponding keyword in Ad Group dashboard. When the Max CPC of the ad group is updated, the same validation should be triggered for all keywords without a defined Max CPC. If the updated Max CPC is higher than the maximum bid, an error message can be shown: The Max CPC for the following [keyword/ad group] has exceeded the maximum allowable amount of [amount in local currency]: [keyword ad group]

If the updated Max CPC is higher/equal to the minimum bid (but below the maximum bid), the status of the corresponding keyword(s) can be changed from "inactive" to "inactive (user paused)". Only a keyword with the "inactive" status with reason code "below minimum bid" is eligible to be changed to "inactive (user paused)". In addition, the same validation should be applied to each keyword when Max CPC of that keyword is updated. If the updated Max CPC is higher than the maximum bid, an error message can be shown: The Max CPC for the following [keyword(s)] has exceeded the maximum allowable amount of [amount in local currency]: [keyword1, keyword 2, keyword 3]

If the updated Max CPC is changed to NULL or higher/equal to the minimum bid (hut below the maximum bid), the status of the corresponding keyword can be changed from "inactive" to "inactive (user paused)". Only keyword with the "inactive" status with reason code "below minimum bid" is eligible to be changed to "inactive (user paused)".

If a user's Max CPC at the category level exceeds the max bid, show an error message to the user that says the following: The Max CPC for the following [category] has exceeded the maximum allowable amount: [category name]

If a user's Max CPC at the category level is below the min bid restriction, do not show an error to the user and just set the status of that category to inactive with a reason of "below minimum bid". The user's Max CPC at the category level should be checked against both the portfolio min/max requirement AND the category-level min requirement (if set). It must satisfy the restrictions at both levels. This check should be made both during creation and if the Max CPC is edited. If a category has a status of Inactive (Below Min Bid) and the Max CPC is edited and is no longer below the minimum bid restriction, the status should be changed to Inactive (User Paused) so that the user can decide when to activate it. The minimum bid and maximum bid can be applied for all keyword matchtypes. Keyword Ad Group's status will not be affected in respect to the minimum bid and maximum bid value. During each validation, the minimum and maximum bids stored in US dollars can be converted real time using the latest conversion rate in the database to the currency of the user's account.

Account Info Page

From the Account Information page, users can have the ability to view and modify personal information and billing information.

Personal Information

Changes made to user Ad Portal account settings cannot propagate to the user Publisher Portal settings. The following fields can be displayed and can be modified (with the exception of the Country field):

Email address
Primary phone number
Company/Individual name
Address line 1
Address line 2 (not required)
City
Country (non-editable)
State
Zip/Postal Code
Business type
Primary business model
Business description
host Seller Account User ID
host Seller Account Password Billing Information Billing information can be set separately for users' Publisher and Advertiser Portal accounts.

UI Reporting

Reporting data can be available in the following UI pages:
Account Dashboard (Campaign-level data)

Campaign Dashboard (Ad Group-level data)
Ad Group Dashboard (Keyword-level data)

Users can have the ability to export reporting data from each dashboard view. Exported report can be the complete data set (not just the current page) without pagination. Existing Publisher file format for UI reporting can be used, i.e. excel or tab delimited text files. For both the UI view and export, users can have the ability to specify a date range for the report where range restriction can be the same as the UI view. Historical data can be available for the previous 6 months. All monetary data elements can be displayed with the currency set for the Account.

Figure 17:
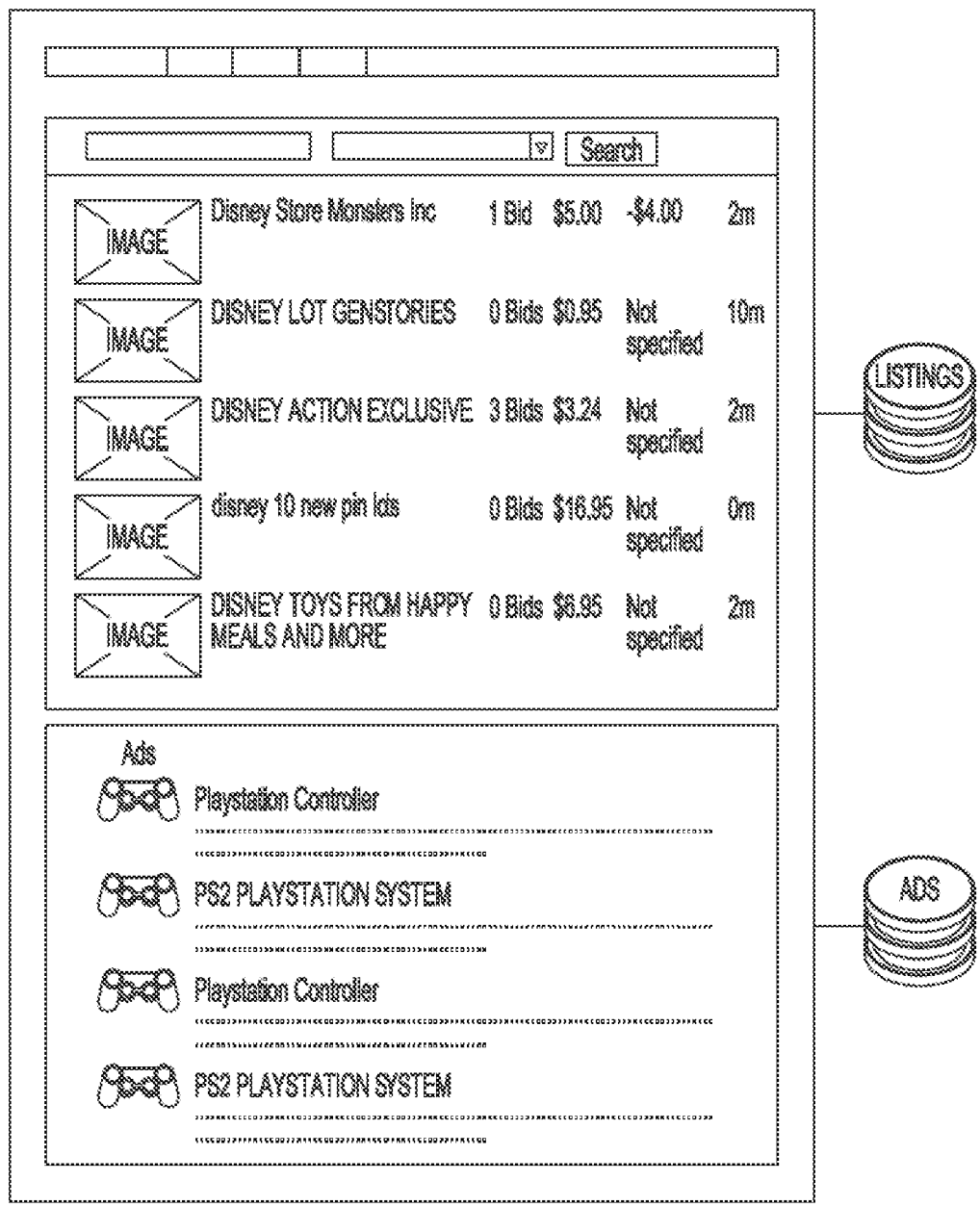
FIG. 17-19 illustrate revenue allocations for ads displayed on web pages in a particular embodiment.
Figure 18:
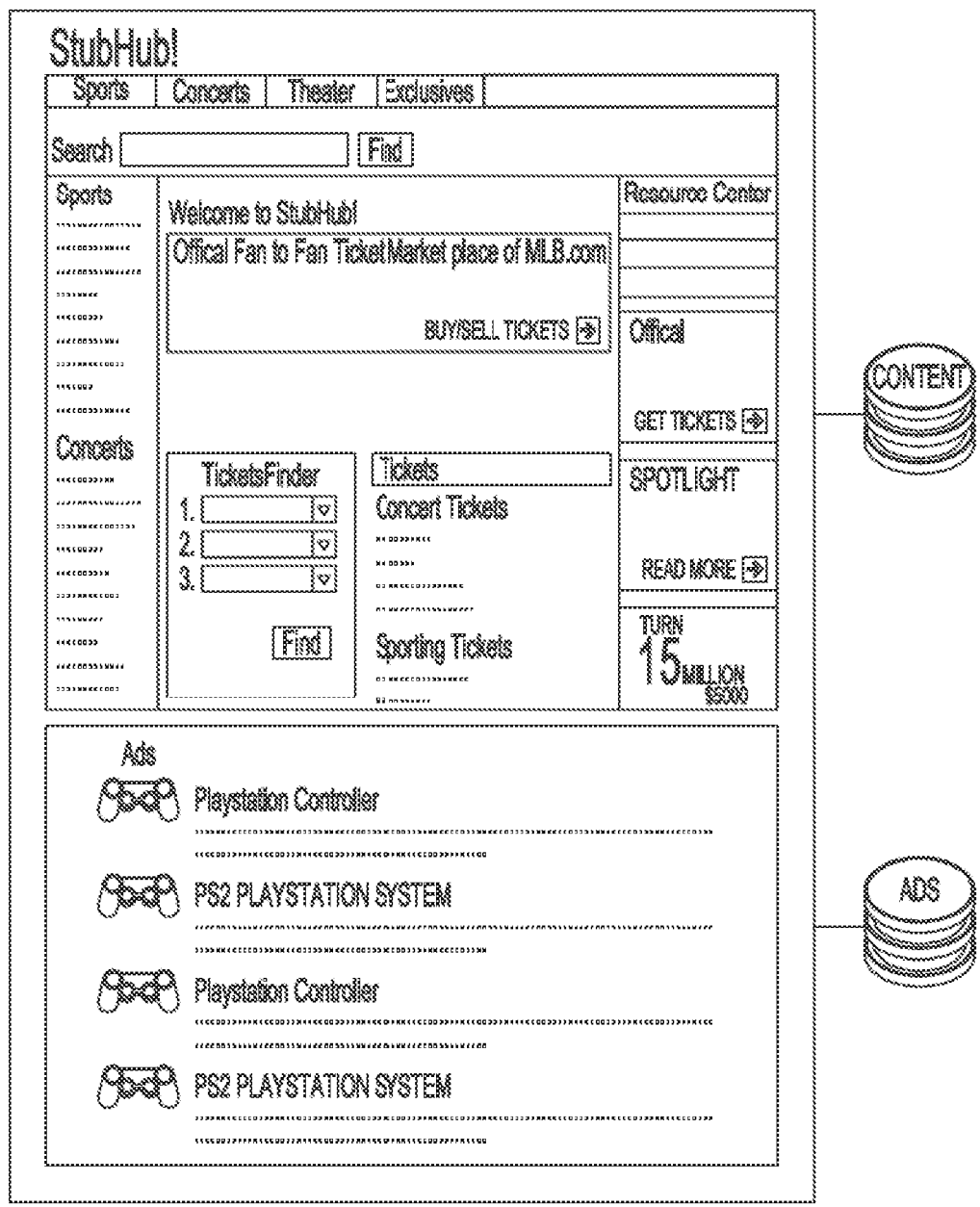
Figure 19:
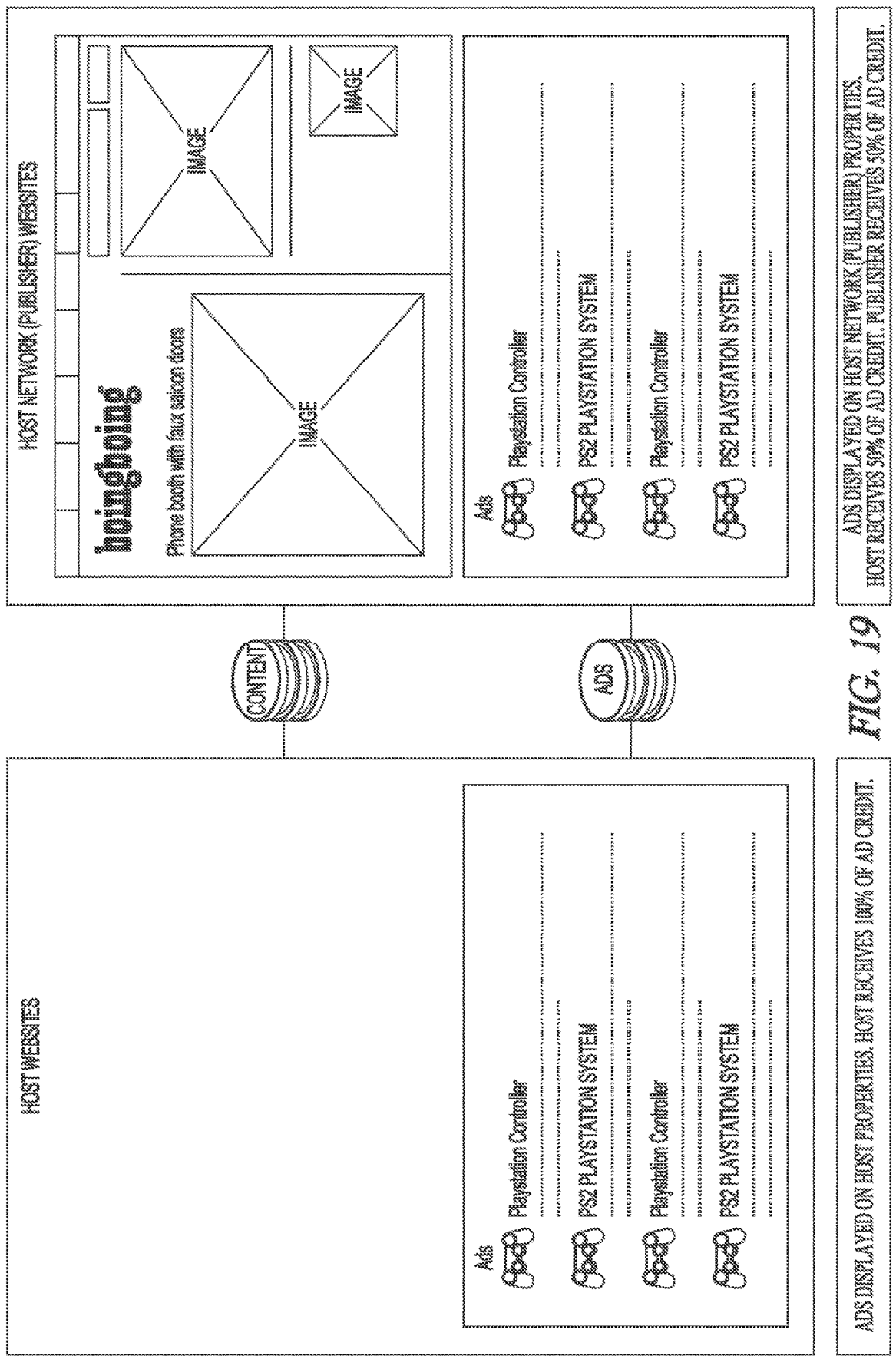

FIG. 17-19 illustrate revenue allocations for ads displayed on web pages in a particular embodiment.

Figure 20:
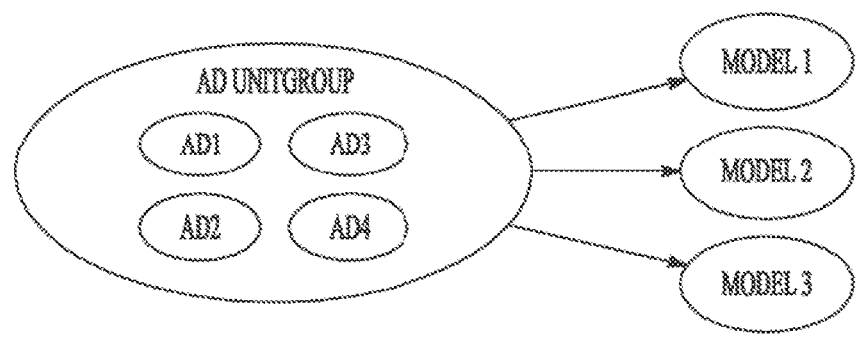
FIG. 20 illustrates basic advertising components of a particular embodiment.

FIG. 20 illustrates basic advertising components of a particular embodiment.

AdUnit
   Combination of advertiser, Keyword (KW) and match Type
AdUnitGroup
   A set of AdUnits defined in NorAd (Optimization Management Console).
   An AdUnit can be active in ONLY one AdUnitGroup
Model
   A set of predefined parameters (coefficients) for a set of variables An AdUnitGroup can have multiple models but can the traffic can be split among these (rotation basis)
Assumptions
   An AdUnit can belong to only one AdUnitGroup
   An AdUnitGroup can have one or more models associated with it. Total rotation percentage is always 100

Figure 21:
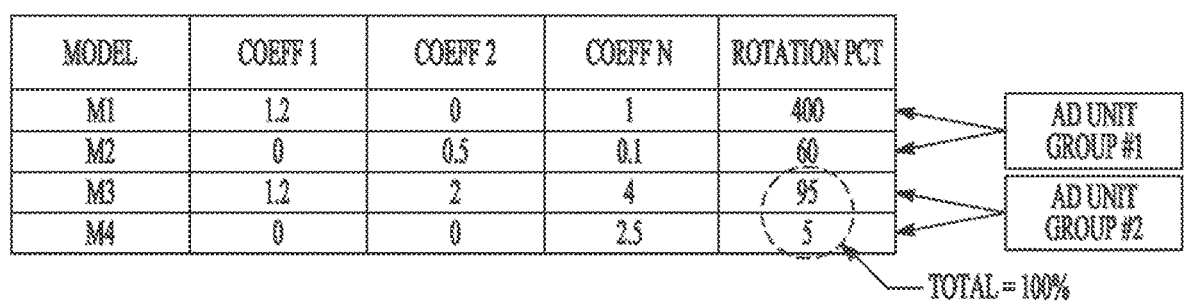
FIG. 21 illustrates operations for setting up advertising models and model level controls in a particular embodiment.

FIG. 21 illustrates operations for setting up advertising models and model level controls in a particular embodiment.
   Pick up a set of AdUnits and create an AdUnitGroup
   Create one or more models and set up values for coefficients for each one
   Assign rotation percentage (total must be equal to 100 for an AdUnitGroup)

Figures 22, 23:
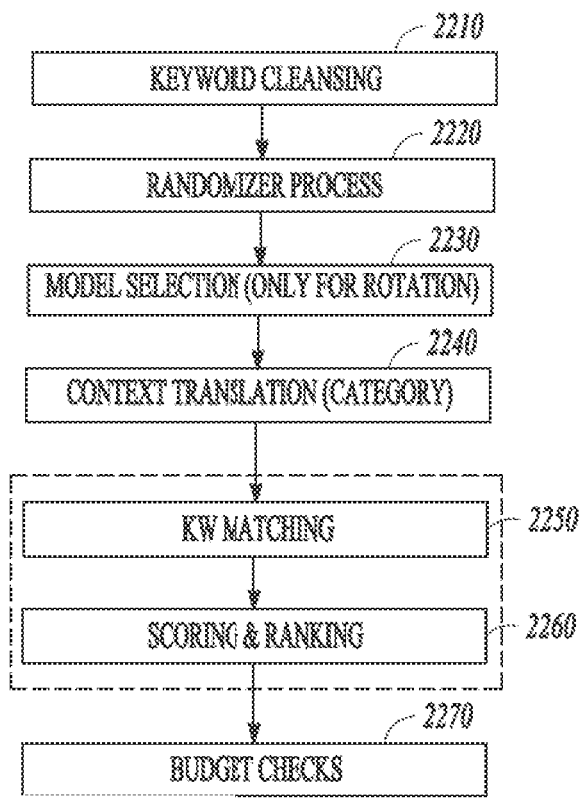
FIG. 22 illustrates an ad call processing flow in a particular embodiment.
FIG. 23 illustrates a process for identifying ad units in random for a particular embodiment.

FIG. 22 illustrates an ad call processing flow in a particular embodiment. In FIG. 22, the Keyword Cleansing component (2210) includes the following:
   Keyword Cleansing (2210): User entered search string can be edited for:
   Special characters or symbols
      Before the search string goes to optimizer, a very basic cleansing can be done—such as removal of &, extra spaces, convert all to lower case
   Articles (a, an, the)
   Propositions
   Many other noise words
   An Ad Validator and RealTime cleansing component can follow the same approach for cleansing the special characters and symbols In FIG. 22, the Randomizer Process component (2220) includes the following:
   Global Level Randomness: Global parameter to pick up ads randomly.
      For e.g. 2% of the overall traffic can always have one "sub-optimally" ranked ad
   Randomizing Approach: Random function that gives 98% to 2% spilt
   What can Ad container have:
      In a container, it can be a combination of score based and 1 random ad
      Only one position (last one) can have suboptimal ad In FIG. 22, the Rotation Approach component (2230) includes the following:
   An AdUnitGroup can have multiple models associated with it
   There would be pre-defined rotations among those models
   # of models across AdUnitGroups (for a given input context) can be asymmetric
   Rotation Approach: Round robin based on time
      e.g: If the traffic is a 60/40 split between 2 models, first 3 min can be given model 1 then 2 min can be model 2 and so on, In FIG. 22, the Context or Category Translation component (2240) includes the following:
   Input query string (context) can be
      KW (user entered) or
      an host Category (browsing pages)
   In case it's an host category, there can be some "translation" from category to KW
   Options #1
      Use category name =KW
      When the ad call type is category, we can do exact match on the "category" KW
   Option #2
      Maintain a set of KWs for each category In FIG. 22, the Keyword matching component (2250) includes the following:
   Exact Match
      Query String =KW
   Phrase match
      This is basically exact match with all possible "ordered" and "consecutive" sub-sets.
      "blue ipod nano" SHOULD match "ipod" "blue", "nano", "blue ipod", "ipod nano" , "blue ipod nano"
      "blue ipod nano" should NOT match "ipod blue" (wrong order), "nano blue" (wrong order), "nano ipod" (wrong order) and so on
      "blue ipod nano" should NOT match "blue nano" (not consecutive) and so on
      "blue ipod nano" should NOT match "blue ipod nano case" extra word), "new blue ipod nano" (extra word) and so on
   Filter Ads based on models considered for current rotation cycle
   Grouping
   Pick one ad for each advertiser based on score
   Treat all the Phrases matches the same for an advertiser
   Pick "exact" over "phrase" for a advertiser In FIG. 22, the Keyword match proximity component (2250) includes the following:
   Preference can be given to exact match over phrase match
   Preference can be given to all word phrase match over single word match in case of multi-words query string
   The preference can be reflected by multiplying the add with "some factor" at run time based on how keywords are matched against query string In FIG. 22, the Keyword relevancy component (2250) includes the following:
   Query string "blue ipod " SHOULD phrase match "ipod", "blue"
   Some words in the query strong is "HEAD" word. That defines the "intent"
   Over time we can be able to know which word is the "intent"
   Feedback that knowledge into keyword matching logic
   Calculate the score/yield accordingly FIG. 23 illustrates a process for identifying ad units in random for a particular embodiment.

Figure 24:
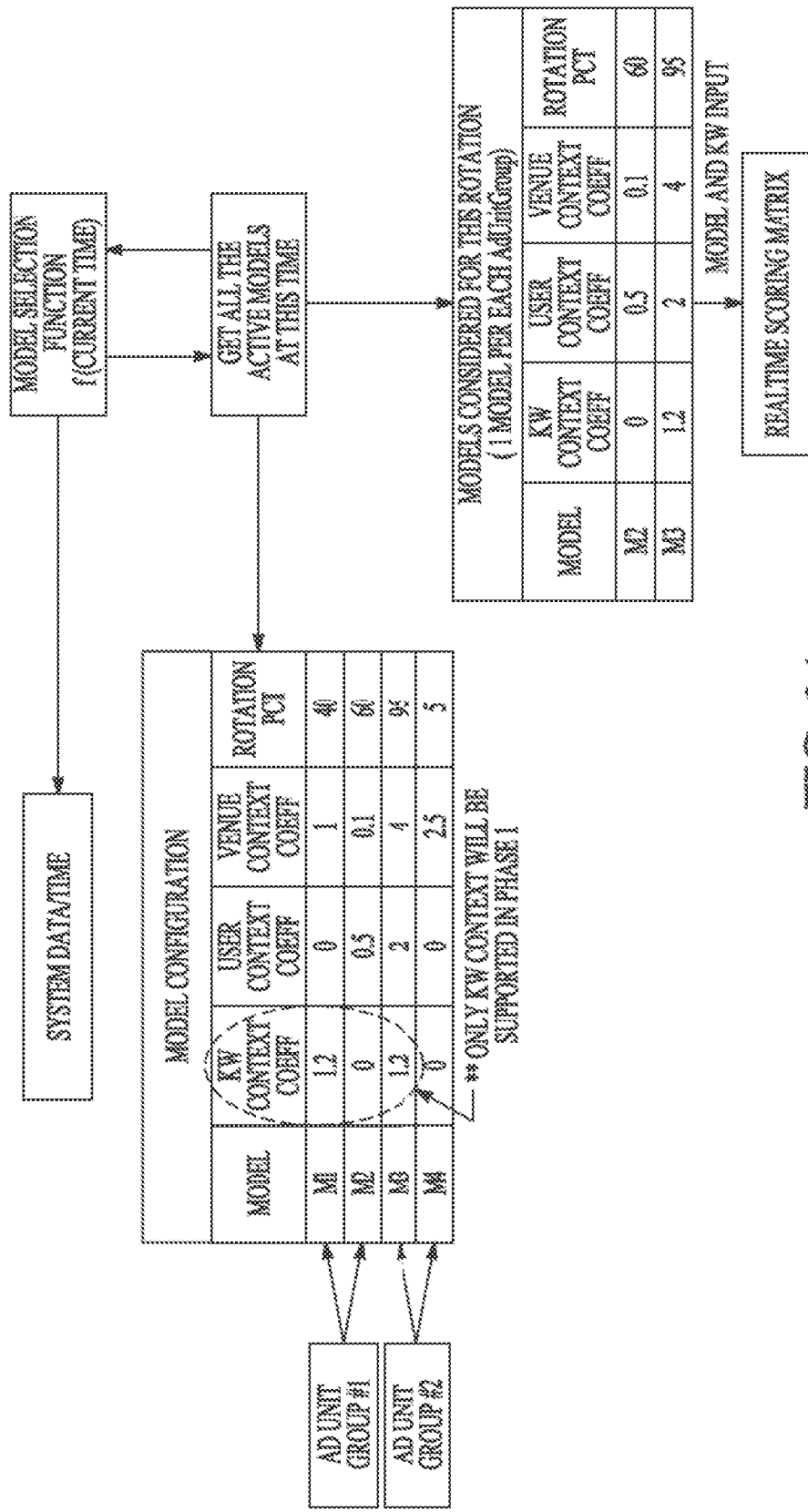
FIG. 24 illustrates an example of the ad rotation process flow used for ad call processing in a particular embodiment.

FIG. 24 illustrates an example of the ad rotation process flow used for ad call processing in a particular embodiment.

Figure 25:
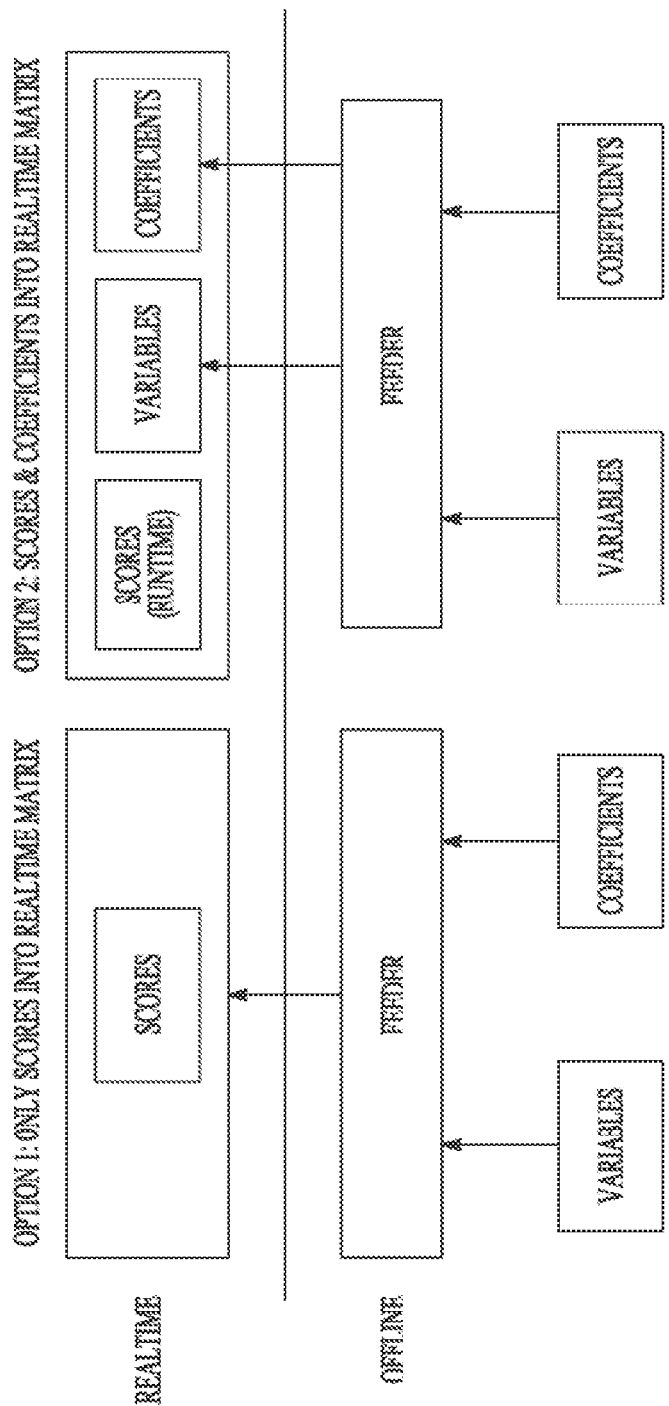
FIG. 25 illustrates a physical model for ad score and coefficient storage in a real time system for a particular embodiment.

FIG. 25 illustrates a physical model for ad score and coefficient storage in a real time system for a particular embodiment.

Figure 26:
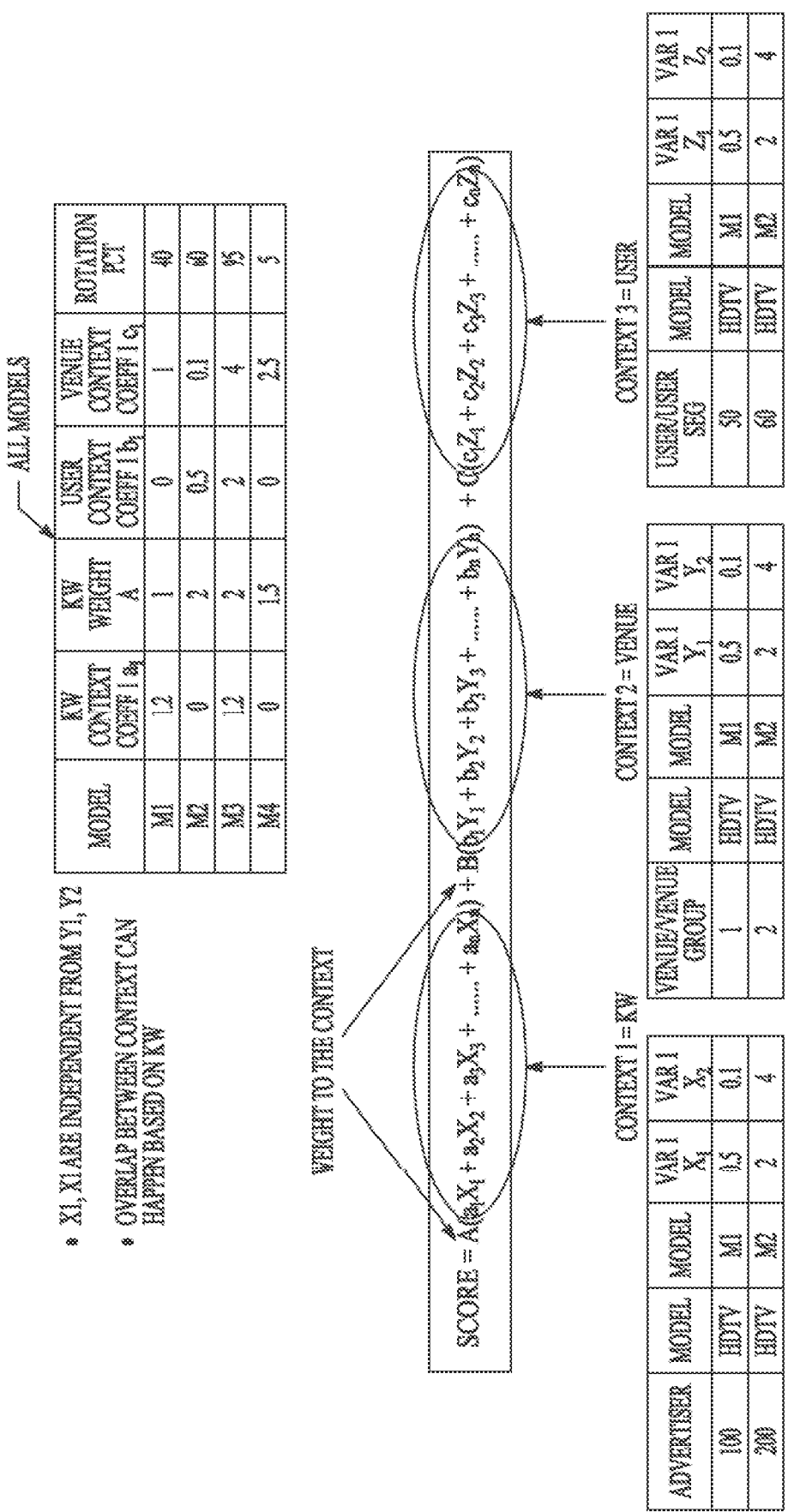
FIG. 26 illustrates a keyword scoring process based on contexts for a particular embodiment.

FIG. 26 illustrates a keyword scoring process based on contexts for a particular embodiment.

FIG. 27 illustrates an example of the Scoring and Ranking (2260) used for ad call processing in a particular embodiment.

Figure 28:
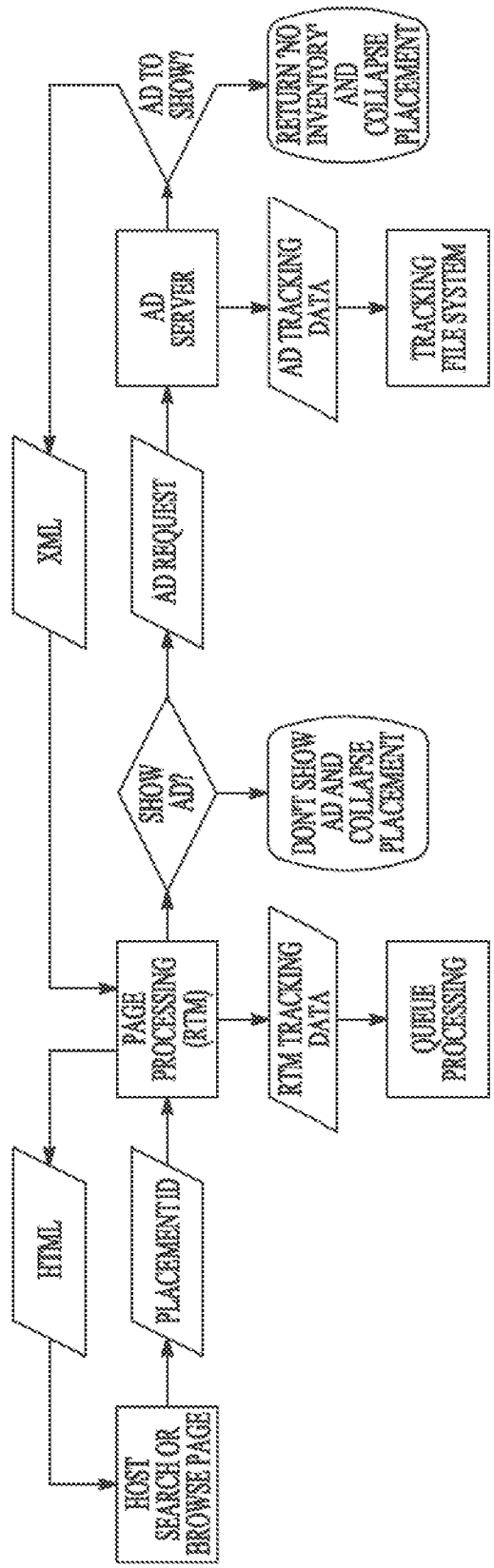
FIG. 28 illustrates an example of the ad serving and impression tracking processing in a particular embodiment.

FIG. 28 illustrates an example of the ad serving and impression tracking processing in a particular embodiment. Ad serving and impression tracking processing can utilize the page processing (RTM) platform, the ad server, and ad tracking platform to serve ads and track impressions. The ad request and response process in a particular embodiment is as follows:
1. The placement ID on the search and browse pages will be passed to RTM as the page is rendered.
2. RTM logic determines whether or not to display an ad.
3. If an ad should be displayed, then an ad request can be made to the ad server.
4. The ad server can determine which ad to return, write tracking information to the Tracking File System, and return the XML in the response to RTM ad request.
5. RTM will transform the XML into HTML, write to the query processor, and return the ad to the browser.

Figure 29:
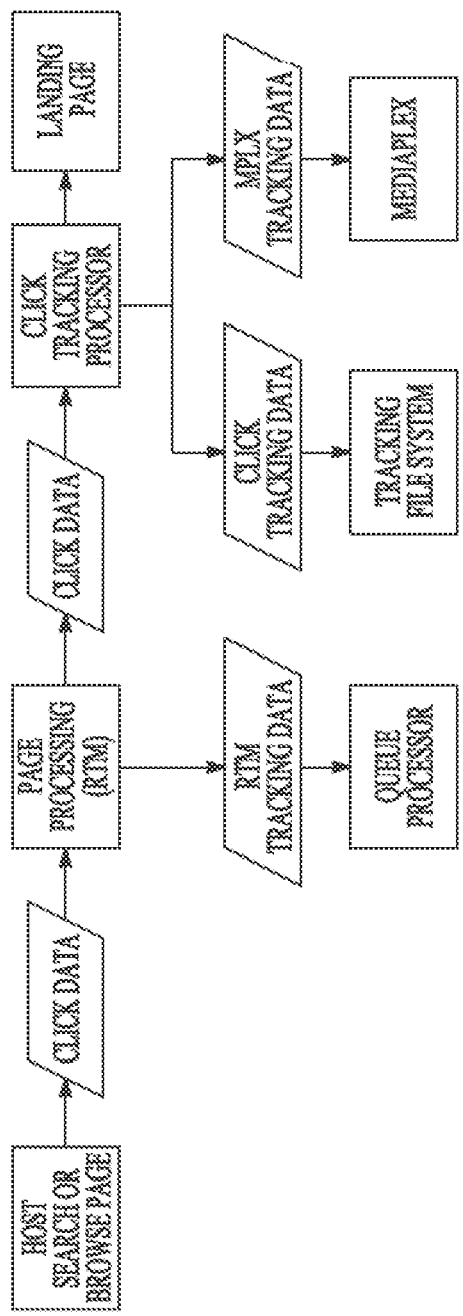
FIG. 29 illustrates an example of the click and click tracking processing in a particular embodiment.

FIG. 29 illustrates an example of the click and click tracking processing in a particular embodiment. Click and click tracking processing can utilize the page processing (RTM) platform, the click tracking processor, and Mediaplex platform to track clicks. The click tracking and response process in a particular embodiment is as follows:
1. When a user clicks on an ad, they will first be redirected to RTM.
2. RTM will write to the query processor and can then redirect to the click tracking processor.
3. The click tracking processor can apply click filtering rules.
4. The click filtering rules can determine if the click is not legitimate. In this case, the tracking information can be written to the Tracking File System and can redirect users to the final landing page, but the budget will not be impacted and the event will not be sent to Mediaplex
5. If the click is legitimate, then click tracking processor can send information about the event to Mediaplex, write tracking information to the Tracking File System, impacts to the budget will be recorded and then redirect users to the final landing page.

Figure 30:
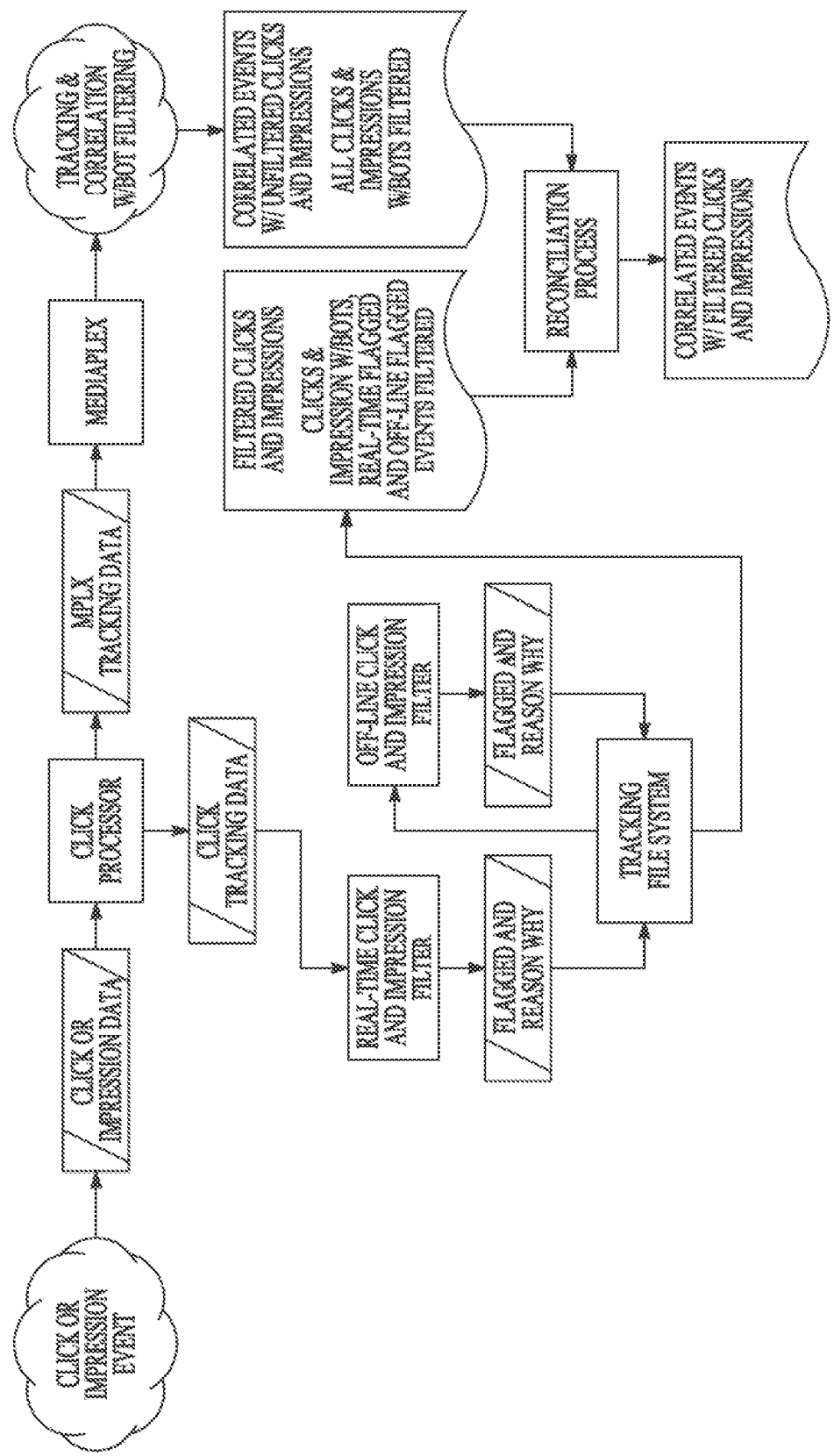
FIG. 30 illustrates an example of the real-time impression and click filtering processing in a particular embodiment.

FIG. 30 illustrates an example of the real-time impression and click filtering processing in a particular embodiment. Real-time impression and click filtering processing can utilize the click tracking processor and Mediaplex platform for impression and click filtering. The real-time impression and click filtering processing in a particular embodiment is as follows. In real-time, the click processor can check against the following rules:
  a. The GUM of the RTM request must be newer than N seconds (Initially the "N" will be set to 15 seconds.)
  b. The User-Agent must be one of the white listed agents. For example, the following user agents can be supported.
    i. Internet Explorer
    ii. Firefox
    iii. Safari
    iv. Opera This check may only be done for click tracking. If the user agent is not one of the supported user agents, the click may be considered to be an invalid click and the budget should not be deducted.
  c. The impression command checks if the impression was generated within last N milliseconds, otherwise the impression is considered as a fraud (too slow impression. Replay?). The generated content includes an impression URL and several Click URLs. All of those URLs have some part encoded using eSAMS rotating keys stored in the database. The encoded part contains timestamp and globally unique impression ID. The click URLS may be encrypted using eSAMS.
  d. The click command checks if the command was NOT generated within the last M milliseconds (initially M will be set to 24 hours). The impression timestamp can be sent as a part of the Click URL. When the click is received by the Ad server, the timestamp can be extracted from the URL and compared against the system time. If the (click time—impression time) is greater than "m" milliseconds, the click will be considered invalid and the budget will not be deducted. "M" can be configurable using the host site parameters table. With the initial configuration any clicks that occur exceeds 24 hours are considered to be invalid.
  e. Traffic Limiter—A host traffic limiter can provide the ability to filter IP addresses that are hitting a particular page too frequently. The following rule can be created. If an IP address hits the click processor pool "x" times in "y" seconds, then block this IP address for "z" seconds.
    i. X can initially be set to XX
    ii. Y can initially be set to YY
    iii. Z can initially be set to ZZ; this can range from a minimum of 10 seconds to a maximum of 24 hours.
    This rule can be applied to the Ad Click Commands only. It will not be applied to the RtmClk commands. This rule will not be applied to the AD Serving commands.
  f. It is understood that click processing may want to use this rule to identify recurring offending IPs so that they can be permanently blocked if necessary ALL click events, even those marked as fraudulent, can be sent to Mediaplex. Impression events may not be sent to Mediaplex. Any impression or click event that is flagged as filtered must not do any of the following:
  a. Impact budgets
  b. Be reported to advertisers
  c. Impact click-through rate calculations Because click processing may apply real-time and off-line click and impression filtering, it may be necessary to reconcile against the list of correlated events that are returned in the Mediaplex data teed.

Figure 31:
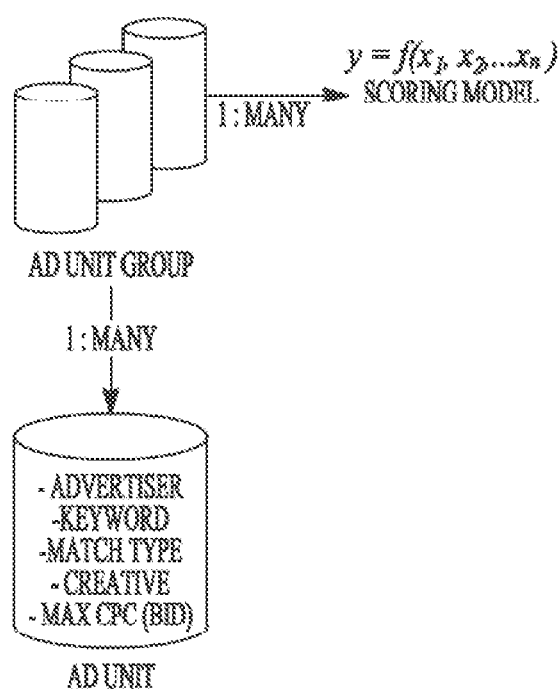
FIG. 31 illustrates an example of the optimizer in a particular embodiment.

FIG. 31 illustrates an example of the optimizer in a particular embodiment. The Optimization Management Console can be a web-based tool that allows administrative users to control the way Ad Units are scored by both the offline and real-time optimization systems of a particular embodiment. Referring to FIG. 31, an Ad Unit is a container that represents the most granular level of ad detail for which we can set optimization controls. These controls can include:
  Account (Advertiser)
  Keyword
  Matchtype
  Creative
  Max CPC (bid)

An Ad Unit is created for each distinct combination of the fields above. The real-time optimizer can optimize at the Ad Unit-level. Note that the system can allow scalability of the Ad Unit dimensions. It is understood that the system can optimize on additional dimensions. An Ad Unit can automatically be assigned to an Ad Unit Group by a scheduled batch job based on defined rules. The Optimization Management Console can allow administrative users to control scoring at the Group-level by manipulating Group settings and Scoring Model assignment.

From the Console UI, users can have the ability to set the following parameters for each Ad Unit Group:
  Overall Scaling factor
  Match (in context) score scaling factor
  Offline (intra-day) score scaling factor
  Offline (daily) score scaling factor
  Match tokens scaling factors
  Max score
  Min score A Scoring Model is a set of defined parameters (coefficients) that are applied to a set of variables. Users can create Scoring Models outside of the Ad Unit Group creation and assignment flows. Users can set the following basic criteria for a Scoring Model:
  Folder Name (or choose from existing folder)
  Model Name
  Model Description Users can then assign coefficients to the various scoring parameters. Parameters can be one of the following types:
  Daily parameter—Calculated offline on a nightly basis.
  Intra-day parameter—Calculated on a recurring basis at regular intervals throughout the day From the Console UI, users can have the ability to assign Scoring Models to an Ad Unit Group. Users can assign multiple models to a single Ad Unit Group (up to a max limit), and a single model can be applied to multiple Ad Unit Groups. An Ad Unit Group is not considered active (and cannot be processed by the Offline Optimizer), unless it has at least one model assigned to it. After users have selected the models to associate to the Ad Group, they can enter their rotation distribution settings. Users can set a rotation percentage for each model. The rotation percentages can be defaulted to 1.00/[# of models] and must add up to a total of 1.00 (100%).

Optimization

From the Console users can have the ability to assign Scoring Models to an Ad Unit Group. Users can assign multiple models to a single Ad Unit Group (up to a max limit), and a single model can be applied to multiple Ad Unit Groups. An Ad Unit Group is not considered active (and cannot be processed by the Offline Optimizer), unless it has at least one model assigned to it. After users have selected the models to associate to the Ad Group, they can enter their rotation distribution settings. Users can set a rotation percentage for each model. The rotation percentages can be defaulted to 1.00/[# of models] and must add up to a total of 1.00 (100%).

In a particular embodiment, the Optimizer can include an offline optimizer and a real-time optimizer. The offline optimizer can generate rule sets for use by real-time optimizer. The Offline Optimizer is a batch job that calculates the Offline score for every active Ad Unit. An Ad Unit is a container that represents the most granular level of ad detail for which we can optimize. This can include:
  Account (Advertiser)
  Keyword
  Matchtype
  Creative
  Max CPC (bid)

An offline score may not be factored into the real-time optimization model, but the infrastructure can be designed to support real-time optimization based on both CPC (cost per click) and an offline score. For category-targeted Ad Groups, users may not have the ability set or manage keyword-level data in the Ad Portal UI and keyword-level data may not be present in the Ad Portal campaign tables. Instead, a mapping can be maintained between each Ad. Portal category and a keyword list. The optimizer can use this mapping to generate keyword-level Ad Units for category-targeted Ad Groups, while assuming the following:
  Landing Page and Max CPC data set at the category (Ad Group) level can be used for all category Ad Units.
  The Phrase matchtype should be used for all search-targeted keywords. The
  Exact matchtype can be used for the browse listings token keyword (one per Ad Portal category).
    The category keyword-type (search-targeted or browse token) be available.

At the conclusion of the Offline Optimizer run, the Ad Unit identifying information (including Max CPC) and additional data necessary for ad serving can be pushed into memory for access by the Real-time Optimizer. The Offline Optimizer can send over a static Model ID along with the data above for access by the Real-time Optimizer. Doing this can minimize the infrastructure and code changes that would be necessary once the system is enhanced to support multiple models.

Real-Time Optimizer

During real-time operation, the RTM can make an ad request call to the Ad Server (see above). The following data passed in from RIM can be relevant for ad optimization by the Ad Server:
  User search query (if available)
  Host Site ID
  Host Category ID
  Number of ads
  Advertiser-type restriction (Host only, non-Host only, no restriction)

The Ad Server can do the following before making a call to the Real-time Optimizer:
  The Host Site ID can be used to determine the targeted Country
    US-targeted ads should be served to the Host US sites.
    Germany-targeted ads, for example, should be served to the Host DE sites.
  The user search query and category ID can be used to determine the keyword:
    a User search query can be normalized
      The user query can be converted into lowercase.
        German characters:
          ä should be substituted for Ä
          ö should be substituted for Ö
          ü should be substituted for Ü
          é and ß do not have multiple cases and therefore do not require substitution
        All characters not allowed in keyword strings can be substituted with " " (whitespace). This includes any character not in the following lists:
          Allowed special characters: . ' / - <space>
          Allowed German characters: ä é ö ü ß
          Allowed alphanumeric characters: a through z, 0 through 9

Duplicate, leading and tailing spaces can be removed (after special character whitespace substitution is applied)

If the search query is not null, the normalized query can be interpreted as the keyword If the search query is null, a hash can be applied to the combination of the category ID and country code to determine the keyword string If both the search string and category ID fields are null, no ads can be returned.

The Ad Server can make a call to the Real-time Optimizer, passing in the following data:
Keyword
Number of ads
Country
Advertiser-type restriction Based on the parameters above, the Real-time optimizer can determine which ads should be served. To do this, the optimizer can calculate a final score per qualifying Ad Unit per model, and serve the top n ranked ads (where n is the number of ads requested by RTM). In order for an Ad Unit to qualify, it must satisfy the following criteria:

For exact match Ad Units, the Ad Unit keyword string must exactly match the keyword passed in from RTM.

For phrase match Ad Units, the entire keyword string must appear as whole (with no breaks in between) in the search string passed by RTM.

For example, for the search string "cheap brand new blue ipod nano"

Keywords "blue ipod", "ipod nano", "new blue ipod", and "cheap brand new blue ipod" are all eligible.

Keywords "cheap ipod", "blue ipod nanos", "cheap brand new blue ipod nano plus" and "blue nano" are not eligible.

For all ads, the corresponding Ad Group should not have met or exceeded its daily allotted budget. This can be determined by making a real-time call to the budget server.

If an Advertiser-type restriction is specified, the ad must have the following characteristics:

If only Host ads must be served, the landing page domain must equal *.host.*

If only non- Host ads must be served, the landing page domain must not equal *.host.*

The ad must be targeted to the Country that is passed in from RTM. RTM can translate the localized site into the Country.

If users have inserted a {keyword} replacement tag within their creative text, it can be substituted with the keyword string (not the search string, before being served. For qualifying Ad Units, a final score can be determined per Ad Unit per model by using the following parameters:
Max CPC
Offline Score
Match Score The Match Score is a static multiplier that can applied based on the degree to which a keyword matches the search string passed in by RTM. For exact match keywords, a constant multiplier can be applied to all keywords (this may be 1.0). For phrase match keywords, the degree of the keyword match can be determined by the following formula:

Degree of Match=(# of words/tokens in keyword string)/(# of words/tokens in search string)

For each "degree of match" range, we can maintain a match score multiplier that can be applied for phrase match keywords that fall in that range. It can be assumed that the ranges can cover 0-100% without any gaps or overlaps. The factors that determine the Match Score may not be configurable through any user interface, but it should be designed in a way that allows modifications on an infrequent basis.

For a segment of served ads, a degree of randomness (Perturbation Factor) can be applied to the final score for eligible Ad Units before the final ranking is determined. The Perturbation Factor is a dynamic multiplier that can conditionally apply a degree of randomness for a segment of served ads. We can making the following assumptions:

Perturbation can be applied for a specified static percentage of Ad Server calls Perturbation can be applied for a specified static segment of ads within an Ad Server call (i.e., the last ad returned for a placement)

A distinct perturbation multiplier can be applied to each ad eligible for perturbation In order to be eligible for perturbation, an ad must be preliminarily ranked at or below the position(s) that are being targeted for perturbation (i.e., if perturbation is being applied to the last ad for a placement containing 3 ads, all ads ranked 3 or below can be eligible). The ad that would have normally been displayed is still in play for perturbation.

The Perturbation Factor can be randomly generated for each eligible ad and can be confined to a defined static range (i.e., random factor between 0.70 and 1.20).

The Real-time Optimizer applies all of the multipliers above to the Max CPC for each Ad Unit to determine the Effective CPC (eCPC) for each. The Optimizer can return the top n ranked ads by eCPC (where n is the number of ads requested by RTM) to the Ad Server, which can then pass the data back to RTM (see above). The Optimizer may not return more than one ad from the same Account (Advertiser) for a single RTM call. In addition, no more than one ad per account (advertiser) should be served per RTM call.

For example, in reference to the table below, if RTM requests 5 ads for the search string "nintendo wii remote", Optimizer may determine that ads 1-5 below should be served:

| Rank | Keyword | Match-type | Max CPC | Match Multiplier | Perturbation Multiplier | Effective CPC |
|---|---|---|---|---|---|---|
| 1 | Nintendo Wii Remote | Exact | $0.60 | 1.00 | 1.00 | $0.60 |
| 2 | Wii Remote | Phrase | $0.80 | 0.70 | 1.00 | $0.56 |
| 3 | Nintendo Wii Remote | Exact | $0.50 | 1.00 | 1.00 | $0.50 |
| 4 | Wii Games | Phrase | $0.60 | 0.55 | 1.00 | $0.33 |
| 5 | Nintendo Wii Remote | Exact | $0.30 | 1.00 | 0.92 | $0.28 |
| 6 | Nintendo Wii Remote | Exact | $0.10 | 1.00 | 1.12 | $0.11 |

In order to determine the Actual CPC (the amount actually charged for a click) for each served ad, we can use the Vickrey Auction model. The Actual CPC for each served ad can be the minimum between:

the Effective CPC for the Ad Unit ranked one below plus one cent, or the Max CPC of the Ad Unit An additional multiplier may be applied globally on top of the value above to determine the final Actual CPC value. In this case, the assumption is that the multiplier can be less than 1.00 to ensure that the final Actual CPC value is not greater than the Max CPC value. In the example table above, if the Actual CPC multiplier is 1.00, the top ranked Ad Unit would have an Actual CPC value of $0.57. Ad Unit #5 would have an Actual CPC of $0.12.

A particular embodiment includes other features enabled by the design structures described above. These features can include: 1) Keyword Bidding by Category, and 2) Category Moniker.

In a particular embodiment of the Keyword Bidding by Category functionality, the association of keywords and category can build an affinity between keywords and categories. This affinity can be used to create an ad format with bidding on keyword & category level. 'Category' functionality can extend to other grouping functions, linked with host content including a host category hierarchy. In a particular embodiment of the Keyword Bidding by Category functionality, an example method can include the following operations:

Identify keywords searched by buyers on a host site just prior to their purchases. In this method, we make sure to account for the ratio of unique buyers to purchases to eliminate any noise in the data. There are tranches of these ratios to account for low and high number of purchases.

The host site category of the purchase is noted.

Normalize the keywords. All keywords with length greater than 80 are excluded. Any keyword with characters other than the allowed characters is excluded. Allow special characters: . ' / - <space>. Allow German characters: ä é ö ü ß. Allow the alphanumeric characters: a through z, 0 through 9.

A keyword is mapped to only one host site category node with the site.

Take the sum of bid counts for each category node level and total of bid counts for that keyword across categories in the same site.

Calculate the percentage (%) of bid counts at each category node level and those categories are excluded which have less than 60% of bids on the keyword in that site. In a particular embodiment, there is a cap of a maximum of 5000 keywords per category In a particular embodiment of the Category Moniker functionality, an example method can include the following operations:

Create a special keyword (a category moniker) to denote or identify the set of keywords associated with the corresponding category.

Enable a bidder to bid on the entire set of keywords associated with a category by allowing the bidder to bid on the category moniker.

Market Cooperative (Co-op) Functionality of an Example Embodiment

In view of the keyword bidding and advertising system described above, a particular embodiment can provide a computer-implemented method and system for keyword bidding in a market cooperative. As described above, based on a seller/advertiser's keyword bidding, a seller/advertiser's corresponding advertisements are trafficked to $3^{rd}$ party content provider sites, such as search engine providers (e.g., Google, Yahoo!, or MSN) and displayed to users at the content provider sites in a manner corresponding to the seller's/advertiser's keyword bid and the content provider's advertising protocol. In this manner, the seller/advertiser can control the exposure of the seller/advertiser's ads on the particular content provider site. Typically, a higher bid for a particular keyword results in a more favorable positioning of the related advertisement and thus a higher conversion rate. Users of the content provider site(s) can subsequently search for content on the content provider site(s) using search keywords that may correspond to the keywords on which the seller/advertiser previously placed a bid. In that case, advertising of the seller/advertiser that corresponds to the search keyword(s) is shown to the user at the content provider site. If the user at the content provider site then clicks on (or otherwise performs an action on) the advertising of the seller/advertiser, the seller/advertiser gets the benefit of the user action as the user is typically directed to a webpage (e.g., a landing page) associated with the seller/advertiser. In return for this benefit of user action on the seller/advertiser's ad, the seller/advertiser pays the keyword bid amount to the content provider site for serving the ad. The seller/advertiser can determine the value of the user's action on the advertising of the seller/advertiser by tracking the activity of the user to determine if the user subsequently performs a revenue-producing action for the seller/advertiser. Over time and using some of the revenue per click (RPC) modeling techniques described herein, the seller/advertiser can more accurately predict the optimal keyword bid value given an expected RPC resulting from a given keyword/advertisement configured for a particular content provider site.

As described herein, a host site may provide and perform services for a seller/advertiser including managing the keyword bidding process for a particular seller/advertiser. This keyword bidding management service provides many benefits for the seller/advertiser, including, keyword clustering, automated keyword bidding, performance metrics calculations, and other functions as described herein. However, a particular embodiment also provides a market cooperative (co-op) benefit as described next.

As described above, a seller/advertiser (or a host managing keyword bidding for the seller/advertiser) can determine an expected RPC associated with a particular keyword using various embodiments. This expected RPC is based on the value accruing to the seller/advertiser as a result of user action produced by the keyword. However, at the same time that user action produced by the keyword is creating value for the seller/advertiser, the same user action can also be creating value for the host, which is managing keyword bidding for the seller/advertiser. For example, as a result of the user action produced by the keyword and related advertisement, the user at the content provider site may be redirected to a seller/advertiser listing or landing page managed by the host. If the user subsequently makes a purchase or otherwise completes a transaction with the seller/advertiser on the host site, both the seller/advertiser and the host can receive value from the user's transaction. In this situation, the host can benefit when the user completes a transaction with the seller/advertiser. Therefore, the host has an incentive to do what it can to improve the likelihood that the user completes the commercial transaction while the host is managing the seller/advertiser's keyword bidding.

One way for the host to improve the likelihood that the user completes a transaction with the seller/advertiser on the host site is for the host to add value to the seller/advertiser's bid for particular keywords (keyword bid augmentation). If the host adds value to the seller/advertiser's bid for a keyword thereby increasing the value of the keyword bid, the higher value keyword bid is likely to improve the positioning of the seller/advertiser's corresponding ad on the content provider's site and thereby improve the likelihood that a user will perform an action on the ad (denoted a conversion rate improvement). Thus, a host can benefit from adding value to the seller/advertiser's bid for particular keywords. The host can also quantify the value it expects to receive as a result of adding value to the seller/advertiser's keyword bids.

In various embodiments, the host can use historical data and predictive data to quantify or predict the expected value of a user conversion (e.g., user action on an advertisement) on a seller/advertiser's advertisement that relates to a keyword on which the host managed the keyword bidding for the seller/advertiser. For example, the historical data can include data associated with other user conversions on the same or similar keywords, other user conversions on the same or similar advertisements, other user conversions for the same seller/advertiser, other user conversions for similar products/services, and the like. Many other data items related to historical, transactional, product/service, and user information can be captured by the host and used to correlate user conversions with keyword/advertisement combinations. Once enough data is collected, predictive modeling can be used to extrapolate expected conversion rates and resulting RPC values for various keyword/advertisement combinations. When this predictive data is generated, the host can determine an amount of value that can be added to a seller/advertiser's keyword bid to produce a predicted amount of value return to the host. Thus, the host can augment the seller/advertiser's keyword bid by this amount in a market co-op arrangement to increase the resulting value for both the seller/advertiser and the host. An example of this arrangement is illustrated in FIG. 32.

Figure 32:
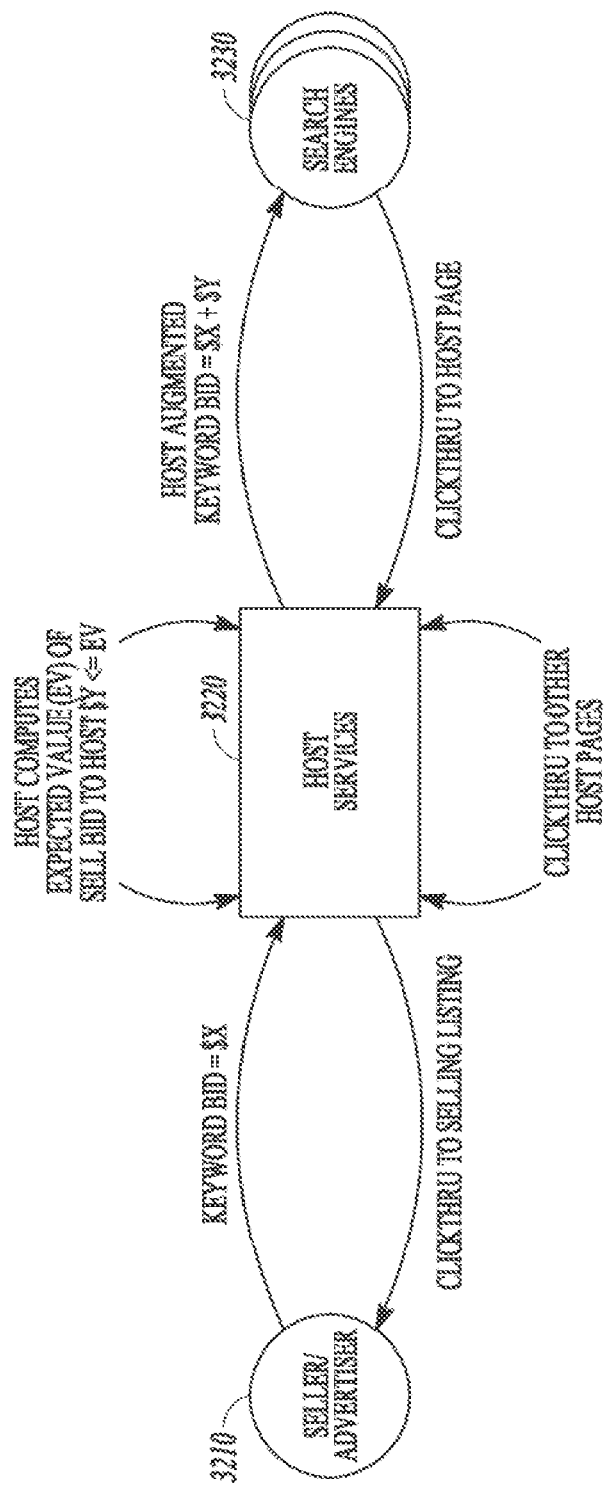
FIG. 32 illustrates the flow of activities in an example embodiment of the market cooperative arrangement.

Referring now to FIG. 32, a diagram illustrates the flow of activities in an example embodiment of the market cooperative arrangement. In the example shown, a seller/advertiser 3210 submits a bid for a keyword or keyword group to a host service 3220. In this example, the seller/advertiser's keyword bid is valued, for example, at $X. This can be a maximum bid amount. As described above, the host service 3220 can use various modeling techniques along with historical and predictive data to compute an expected value (EV) of the seller/advertiser's keyword bid to the host. This expected value (EV) is related to the value to the host 3220 of a user conversion on the seller/advertiser's advertisement corresponding to the keyword upon which the bid was placed. Given this expected value (EV) computation, the host 3220 can determine a value $Y, for example, by which the seller/advertiser's keyword bid can be augmented. This can be a maximum bid augmentation amount. The host service 3220 can then augment the seller/advertiser's keyword bid $X by adding in the host-contributed value $Y based on the expected value (EV) of the keyword bid to the host 3220. The augmented keyword bid $X+$Y can then be submitted to one or more content provider sites, such as search engines 3230 as the keyword bid submittal by a market cooperative including the seller/advertiser 3210 and the host service 3220. This submitted bid can be considered a maximum hid amount.

Referring still to FIG. 32, the augmented keyword bid $X+$Y received by the one or more search engines 3230 causes the one or more search engines 3230 to configure the seller/advertiser's associated advertisement to appear in a particular location on a search engine's 3230 web page, the particular location corresponding to the value of the augmented keyword bid $X+$Y in comparison to other bids received from other advertisers for the same keyword. However, the particular position on a search engine's 3230 web page assigned to the seller/advertiser's associated advertisement is a more favorable location compared to a location that the seller/advertiser's associated advertisement would have been assigned if the seller/advertiser's bid had only been for a value of $X without the augmented value of $Y provided by the host 3220. Given the more favorable advertising location enabled by the augmented keyword bid $X+$Y, the seller/advertiser 3210 and the host 3220 can expect a more favorable conversion rate and a higher RPC from the search engines 3230. Note that the actual traffic value corresponding to the ad may be less than the maximum augmented keyword bid $X+$Y. As shown in FIG. 32, user action (e.g. click-through activity) on the seller/advertiser's associated advertisement on the search engine's 3230 web page can cause the user to be redirected to a host 3220 web page, because the host 3220 is responsible for managing the seller/advertiser's listing and/or landing page. As such, the host 3220 receives value from the user's presence on the host 3220 site. In some cases, the user may click through on a seller/advertiser's product/service listing and complete a commercial transaction with the seller/advertiser 3210. In this case, both the seller/advertiser 3210 and the host 3220 receive value for the completed commercial transaction. In other cases, the user may click through to other host site 3220 web pages and/or listings that are not connected with the seller/advertiser 3210. In some cases, the user may find a web page and/or listing of interest on the host site 3220 and complete a commercial transaction on an item that is not connected with the seller/advertiser 3210. In this case, the host 3220 receives value for the completed commercial transaction but the particular seller/advertiser 3210 does not. In each of these cases, the host 3220 receives value from the user's presence on the host 3220 site as enabled by the augmented keyword bid provided by the host 3220 as part of a market cooperative embodiment described herein.

As a result of the user click through on the seller/advertiser's product/service listing or ad, the corresponding search engine 3230 will charge a traffic value to the host 3220. The actual traffic value corresponding to the ad may be equal to or less than the maximum augmented keyword bid $X+$Y. If the actual traffic value corresponding to the ad is equal to the maximum augmented keyword bid $X+$Y, the host 3220 pays $Y to the corresponding search engine 3230 and the seller/advertiser 3210 pays $X to the corresponding search engine 3230, or to the host 3220 as a proxy for the corresponding search engine 3230. If the actual traffic value corresponding to the ad is less than the maximum augmented keyword bid $X+$Y, the host 3220 and the seller/advertiser 3210 pay pro-rated shares of the actual traffic value based on the ratio of their bid amounts $Y and $X.

In some embodiments, it may be beneficial for the seller/advertiser to have the seller/advertiser's ads trafficked to a variety of content provider sites, instead of just one or a few. In this manner, advertisements can be exposed to a greater number or more diverse group of consumers who visit a group of content provider sites. To offer seller/advertisers additional impressions from these other sources, a host can expand its market cooperative with a variety of content provider sites and with a variety of seller/advertisers. As part of this expanded market co-op, the advertising infrastructure described above can be used to traffic seller/advertiser's ads to a variety of $3^{rd}$ party content providers, such as search engine providers (e.g., Google, Yahoo!, and MSN) and other content providers engaged in keyword auctioning and advertising. Seller/advertisers can have the option to opt-in or out of this market cooperative functionality on a campaign basis. In some cases, the host can subsidize the seller/advertiser CPC's from a host budget. As described above, the environment in which an embodiment operates includes capabilities for sending and receiving information via application programming interfaces (API's). As such, the initial keyword bid can be obtained from the seller/advertiser via an API. Also, the augmented keyword bid can be submitted to the content provider via an API.

Figure 33:
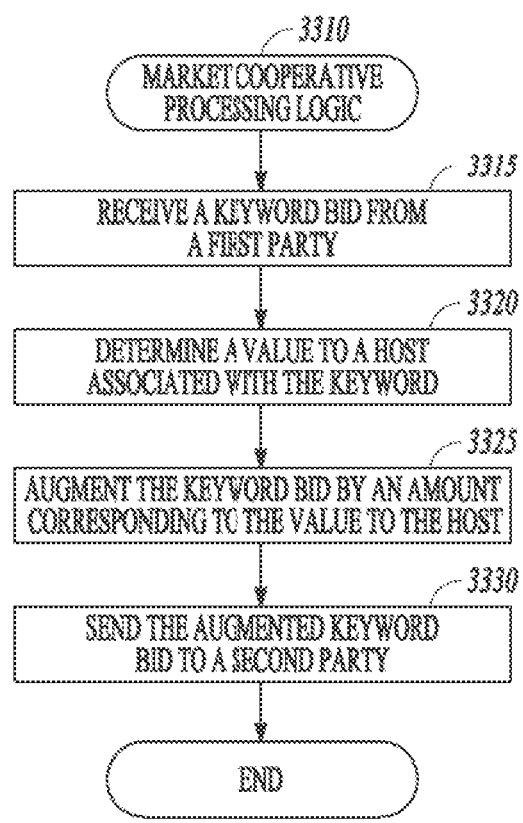
FIG. 33 is a processing flow chart illustrating an example embodiment of a market cooperative bidding module and related method, article of manufacture, and system as described herein.

FIG. 33 is a processing flow chart illustrating an example embodiment 3310 of a market cooperative bidding module and related method, article of manufacture, and system as described herein. The method of an example embodiment includes: receiving a keyword bid from a first party (processing block 3315); determining a value to a host associated with the keyword bid (processing block 3320); augmenting the keyword bid by an amount corresponding to the value to the host (processing block 3325); and sending the augmented keyword bid to a second party (processing block 3330).

Referring now to FIG. 1, a diagram illustrates the network environment in which an example embodiment may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Figure 2A:
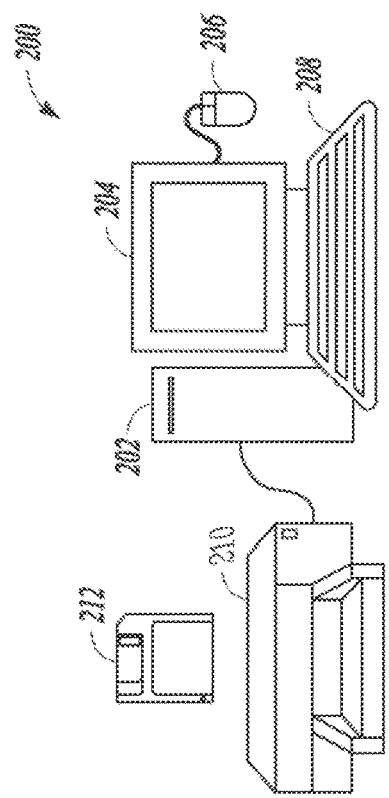
FIGS. 2a and 2b are a block diagram of a computer system on which an embodiment may operate.
Figure 2B:
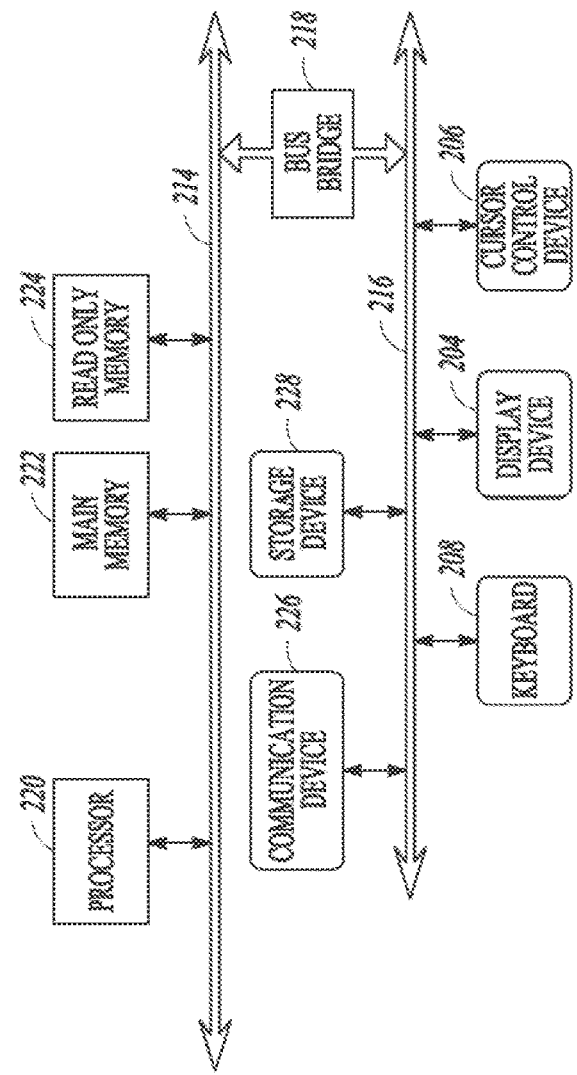

Having briefly described one embodiment of the network environment in which an example embodiment may operate, FIGS. 2a and 2b show an example of a computer system 200 illustrating an exemplary client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot ™. Client 150 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The system of an example embodiment includes software, information processing hardware, and various processing steps, which can be described below. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described. In particular, the use of embodiments with various types and formats of user interface presentations may be described. It can be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented method and system for keyword bidding in a market cooperative are disclosed. While the present invention has been described in terms of several example embodiments, those of ordinary skill in the art can recognize that the present invention is not limited to the embodiments described, but can be practiced with modification and alteration within the spirit and scope of the appended claims. The description herein is thus to be regarded as illustrative instead of limiting.

What is claimed is:

1. A method for online click filtering, the method comprising:
   in an automated operation performed using one or more computer processor devices configured therefor, tracking click activity with respect to one or more online advertisements;
   extracting an impression time of an impression of the one or more online advertisements from a click URL (Uniform Resource Locator);
   determining whether to filter the impression based on at least a check that the impression was generated within a first predefined time interval;
   determining whether to filter a click event of the click activity based on at least a check that a time difference between the click time of the click event and the impression time is greater than a second predefined time interval; and
   registering, based on the determining whether to filter the impression and the click event, a revenue-producing action against an advertiser account associated with the corresponding online advertisement.

2. The method of claim 1, wherein tracking click activity further comprises: determining a validity of the click event based on the time difference.

3. The method of claim 2, further comprising, for each of a multiple click events, determining a corresponding click time of a respective click event based on a corresponding click timestamp received at a tracking system that performs a tracking of the click activity.

4. The method of claim 3, wherein the impression time is associated with a timestamp.

5. The method of claim 3, wherein the tracking of the click activity further comprises, limiting a host traffic by:
   filtering one or more IP (Internet Protocol) addresses based on frequency of hits to a page.

6. The method of claim 5, wherein at least part of the click URL is encoded using rotating keys.

7. The method of claim 6, wherein the encoding is an encryption using eSAMS.

8. The method of claim 7, wherein the time interval is 24 hours.

9. A system for online click filtering, the system comprising:
   one or more computer processor devices configured to perform automated operations comprising:
   in an automated operation performed using one or more computer processor devices configured therefor, tracking click activity with respect to one or more online advertisements;
   extracting an impression time of an impression of the one or more online advertisements from a click URL (Uniform Resource Locator);
   determining whether to filter the impression based on at least a check that the impression was generated within a first predefined time interval;
   determining whether to filter a click event of the click activity based on at least a check that a time difference between the click time of the click event and the impression time is greater than a second predefined time interval; and
   registering, based on the determining whether to filter the impression and the click event, a revenue-producing action against an advertiser account associated with the corresponding online advertisement.

10. The system of claim 9, wherein tracking click activity further comprises: determining a validity of the click event based on the time difference.

11. The system of claim 10, further comprising, for each of a multiple click events, determining a corresponding click time of a respective click event based on a corresponding click timestamp received at a tracking system that performs a tracking of the click activity.

12. The system of claim 11, wherein the impression time is associated with a timestamp.

13. The system of claim 10, wherein the tracking of the click activity further comprises, limiting a host traffic by:
   filtering one or more IP (Internet Protocol) addresses based on frequency of hits to a page.

14. The system of claim 13, wherein at least part of the click URL is encoded using rotating keys.

15. The system of claim 14, wherein the encoding is an encryption using eSAMS.

16. The system of claim 15, wherein the time interval is 24 hours.

17. A non-transitory machine readable storage medium having stored thereon instructions for causing a machine to perform operations for online click filtering, the operations comprising:
   in an automated operation performed using one or more computer processor devices configured therefor, tracking click activity with respect to one or more online advertisements;
   extracting an impression time of an impression of the one or more online advertisements from a click URL (Uniform Resource Locator);
   determining whether to filter the impression based on at least a check that the impression was generated within a first predefined time interval;
   determining whether to filter a click event of the click activity based on at least a check that a time difference between the click time of the click event and the impression time is greater than a second predefined time interval; and
   registering, based on the determining whether to filter the impression and the click event, a revenue-producing action against an advertiser account associated with the corresponding online advertisement.

18. The non-transitory machine readable storage medium of claim 17, wherein tracking click activity further comprises: determining a validity of the click event based on the time difference.

19. The non-transitory machine readable storage medium of claim 18, further comprising, for each of a multiple click events, determining a corresponding click time of a respective click event based on a corresponding click timestamp received at a tracking system that performs a tracking of the click activity.

20. The non-transitory machine readable storage medium of claim 19, wherein the impression time is associated with a timestamp.

* * * * *